(12) United States Patent
Asano et al.

(10) Patent No.: US 6,218,753 B1
(45) Date of Patent: Apr. 17, 2001

(54) MOTOR USING ROTOR INCLUDING INTERIOR PERMANENT MAGNET, AND APPARATUS-DRIVING-UNIT EMPLOYING THE SAME MOTOR

(75) Inventors: Yoshinari Asano, Takefu; Masayuki Shinto, Sabae; Toshio Yamamoto, Fukui, all of (JP)

(73) Assignee: Matsushita Electric Industrial C., Ltd. (JP)

( * ) Notice: Subject to any disclaimer, the term of this patent is extended or adjusted under 35 U.S.C. 154(b) by 0 days.

(21) Appl. No.: 09/360,716

(22) Filed: Jul. 26, 1999

(30) Foreign Application Priority Data

Jul. 24, 1998 (JP) .................................................. 10-208917
Aug. 21, 1998 (JP) .................................................. 10-235289

(51) Int. Cl.⁷ .......................... H02K 21/12; H02K 1/00; H02K 1/22
(52) U.S. Cl. .......................... 310/156; 310/216; 310/261
(58) Field of Search ...................... 310/156, 265, 310/261, 216, 217, 218

(56) References Cited

U.S. PATENT DOCUMENTS

| | | | | |
|---|---|---|---|---|
| 3,884,317 | * | 5/1975 | Kinzel ................................. | 180/34 |
| 5,173,629 | * | 12/1992 | Peters ................................. | 310/216 |
| 5,266,859 | * | 11/1993 | Stanley ................................ | 310/216 |
| 5,666,015 | * | 9/1997 | Uchibori et al. ................... | 310/156 |
| 5,679,995 | * | 10/1997 | Nagate et al. ...................... | 310/156 |
| 5,894,182 | * | 4/1999 | Saban et al. ........................ | 310/217 |
| 6,008,559 | * | 12/1999 | Asano et al. ....................... | 310/156 |
| 6,049,153 | * | 4/2000 | Nishiyama et al. ................. | 310/156 |

FOREIGN PATENT DOCUMENTS

| | | |
|---|---|---|
| H8-331783 | 12/1996 | (JP) . |
| H8-331823 | 12/1996 | (JP) . |
| H8336246 | 12/1996 | (JP) . |
| H9-195379 | 7/1997 | (JP) . |

\* cited by examiner

*Primary Examiner*—Nestor Ramirez
*Assistant Examiner*—Dang Dinh Le
(74) *Attorney, Agent, or Firm*—Rossi & Associates

(57) ABSTRACT

The motor includes the following elements: a stator-core having plural teeth, and a yoke that links the teeth, coils wound on the teeth in a concentrated winding form, and a rotor with interior permanent magnets. The rotor with interior permanent magnets includes the following elements: a rotor core having plural slits of which ends extend closely to the rotor circumference, permanent magnets positioned in the slits, non-magnetic-sections provided between the circumference of the rotor-core and respective ends of permanent magnets. This construction allows the motor to withstand persistently demagnetization, to be a smaller size with high efficiency, and to be manufactured in a highly efficient manner. The motor can be integrated as a driver into an apparatus driving unit.

24 Claims, 19 Drawing Sheets

MOTOR USING ROTOR INCLUDING INTERIOR PERMANENT MAGNET, AND APPARATUS-DRIVING-UNIT EMPLOYING THE SAME MOTOR

FIELD OF THE INVENTION

The present invention relates to a driving motor used in air conditioners, industrial apparatuses and electric bicycles. More particularly, it relates to a motor structure that employs a rotor core having an interior permanent magnet, and utilizes not only magnet torque but also reluctance torque so that a higher efficiency motor can be realized.

BACKGROUND OF THE INVENTION

A high efficiency motor, which can utilize magnet torque as well as reluctance torque by burying interior magnets within a rotor core, is well known in the market, one example is disclosed in the Japanese Patent Application Unexamined Publication No. H08-331823. FIG. 18 is a cross section illustrating this kind of conventional motor.

In FIG. 18, stator 401 comprises a plurality of teeth 403 and yoke 405 which connects roots of the plural teeth, and stator 401 is shaped as a ring. A plurality of slots 407 formed between teeth 403 are wound in a three-phase winding manner.

Rotor 410 is substantially coaxial with stator 401 and is shaped substantially as a cylinder, and faces an inner wall of stator 401 via an annular space. Rotor 410 has four rotor poles, and is supported by a bearing (not shown) so that rotor 410 can rotate on shaft 421. Four slits 413 bored through axially and disposed at equal intervals along a rotational direction of rotor core 411 are provided on rotor 410, and plate-like permanent magnet 415 is inserted into each slit. A terminal plate (not shown) is disposed on each axial end of rotor core 411 to secure permanent magnet 415. The terminal plate is fixed on the end face by riveting pin 425 through hole 423, whereby the permanent magnet 415 is fixed into rotor core 411. An outer wall of rotor 410 has notches 419 at boundary areas between the respective rotor poles, and both of longitudinal ends of permanent magnet 415 are adjacent to respective notches 419. An electric current runs through the stator coil to create a rotating magnetic field. Then, the rotor poles attract/repel teeth 403 of stator 401, thereby spinning rotor 410.

In the above structure, the following relation is established between inductances Ld and Lq: Ld<Lq where Ld is an inductance along "d" axis which crosses the rotor pole at right angles, and Lq is an inductance along "q" axis extending through the boundary area between the rotor poles.

In general, motor torque "T" is expressed by the following equation:

$$T = Pn\{\psi a \cdot I \cdot \cos\beta + 0.5(Lq-Ld)I^2 \cdot \sin 2\beta\}$$

where, Pn: a number of paired rotor poles,

ψa: interlinkage magnetic flux

I: stator coil current

β: leading phase angle of the current I (electrical angle)

In the equation discussed above, the first term represents magnet torque, and the second represents reluctance torque. Since the relation of Ld<Lq is satisfied, a winding current is so controlled to advance the phase of the winding current "I" with regard to respective induced voltage generated in each phase winding, thereby β becomes greater than zero (β>0), and the reluctance torque is generated. When β is set at a predetermined value, the greater torque "T" can be produced with a same current than the case where only the magnet torque is available.

However, according to the above structure, since steel section 417 having high permeability exists between slit 413 and notch 419, magnetic flux at the end of permanent magnet 415 runs through magnetic path 430 of steel section 417. The magnetic flux is thus short-circuited as shown in FIG. 18, although it should have reached stator 401 and contributed to torque production. In other words, the magnetic flux decreases by the short-circuited amount, thereby lowering a motor efficiency. Further, the magnetic flux resulted from short-circuited increases cogging torque, which increases noises and vibrations of the motor.

A motor employing another type of interior permanent magnets is disclosed in the Japanese Patent Application Unexamined Publication No. H08-331783 as shown in FIG. 19. This prior art, different from the conventional motor discussed above, has no notches on the outer wall, and a distributed winding method is employed on stators.

In FIG. 19, rotor 503 has four sets of interior permanent magnets 501 and 502 in rotor core 507 made of electromagnetic stacked steel sheets. Magnets 501 and 502 are placed on each pole in a radial direction with a space. Each set of magnets 501 and 502 are places such that "S" pole and "N" pole are adjacent to each other. Magnets 501 and 502 forming a layer structure are placed such that the outer sides of respective outer magnets 501 facing the outer rim of rotor 503 have the same polarity as the outer sides of respective inner magnets 502. Magnets 501 and 502 are shaped as arcs and show their hills toward the rotor center, and the two magnets in the layer structure form substantially concentric circles and lie in parallel. A space between the two magnets is substantially constant.

Rotor 503 as defined above is rotated by composite torque of magnet torque and reluctance torque: i.e. the magnet torque is generated by the relation between the magnet field of magnets 501 and 502 and rotating magnetic field produced by the current running through a group of coils 509 striding over a predetermined number of teeth 506 defined by broken lines 517, on the other hand, the reluctance torque is generated by magnetic paths formed by the rotating magnetic field and appearing between magnets 501 and 502 as well as on the surface of rotor 503. The reluctance torque is thus utilized, thereby realizing a higher efficiency motor than the motor using only magnet torque.

Among such motors as employing interior permanent magnets, another idea is carried out not only to increase efficiency but also to downsize the motor, i.e. a concentrated winding method is practiced on the teeth of stator in a higher density.

However, in conventional motor with the concentrated winding on the teeth, an adjacent magnetic pole turns to an opposite pole when the motor is powered with three-phase 120° current and winding volume for one pole and one phase is concentrated on one tooth. Magnetizing force is thus as strong as twice of the motor with the distributed winding, and therefore magnetic flux runs between the adjacent teeth, which demagnetizes the interior permanent magnets.

SUMMARY OF THE INVENTION

The present invention addresses the problems discussed above and aims to provide a motor with stable driving torque. A motor of the present invention having interior permanent magnets comprises the following elements:

(a) a stator core having a plurality of teeth and a yoke connecting the teeth;

(b) concentrated windings on the teeth;

(c) a rotor having interior permanent magnets;

and the rotor with the interior permanent magnets comprises the following elements:

(c-1) a rotor core having a plurality of slits extending closely to a circumference of the rotor;

(c-2) permanent magnets positioned in the slits;

(c-3) non-magnetic section provided between the circumference of the rotor-core and the ends of respective magnets.

This construction allows magnetic flux due to demagnetizing field to run through the non-magnetic-sections, whereby the demagnetization at the ends of permanent magnets can be restrained. Part of the slit close to the circumference of the rotor-core is particularly subjected to demagnetization; however, the magnetic flux from the teeth due to demagnetization hardly affects the permanent magnets because of the presence of non-magnetic-section. The motor of the present invention thus can restrain the demagnetization at the ends of respective magnets, thereby supplying stable driving torque.

Another motor having a different structure is available. This motor aims to reduce noises and vibrations at spinning. The motor comprises the following elements:

(a) stator core having a plurality of teeth and a yoke connecting the teeth;

(b) windings on the teeth;

(c) a rotor having interior permanent magnets;

and the rotor comprises the following elements:

(c-1) a rotor core comprising stacked rotor-core sheets made of electromagnetic sheet, (c-2) permanent magnets buried within the rotor-core;

(c-3) non-magnetic-sections provided adjacent to or in contact with at least one of end faces of the permanent magnets, ends of positive polar or ends of negative polar. Further, the rotor core comprises a plurality of rotor-core-sheets having different angles made by the forehand non-magnetic-section in the rotating direction of the rotor with regard to the pole boundary lines.

Another construction is available as follows:

(a) stator core having a plurality of teeth and a yoke connecting the teeth;

(b) windings on the teeth;

(c) a rotor having interior permanent magnets;

and the rotor comprises the following elements:

(c-1) a rotor core comprising stacked rotor-core sheets made of electromagnetic sheet, (c-2) permanent magnets buried within the rotor-core;

(c-3) notches provided on the rotor circumference closely to at least one of end faces of the permanent magnets, ends of positive polar or ends of negative polar. Further, the rotor core comprises a plurality of rotor-core-sheets having different angles formed by the forehand notches in the rotating direction of the rotor with regard to the pole boundary lines.

These two constructions discussed above allow the motors to reduce leakage flux between the rotor poles, eliminate unbalance in the radial direction and provide pseudo skew. As a result, noises and vibrations can be lowered.

The present invention also aims to provide an apparatus-driving-unit which employs a motor with interior permanent magnets as a driver. The apparatus driving unit comprises the following elements:

(a) stator core having a plurality of teeth and a yoke connecting the teeth;

(b) concentrated windings on the teeth;

(c) a motor including a rotor with interior permanent magnets;

and the rotor with the interior permanent magnets comprises the following elements:

(c-1) a rotor-core having a plurality of slits of which ends extend near to the outer wall of the rotor-core;

(c-2) permanent magnets in the slits;

(c-3) non-magnetic-sections provided between the outer wall of the rotor-core and ends of the permanent magnets.

The construction discussed above allows the apparatus-driving-unit to consume lower power, be small in size, and be good for driving, e.g. a compressor of an air-conditioner mounted in an electric vehicle. The apparatus-driving-unit is also good for driving an electric bicycle because of its compact size, light weight and a long travel distance by one charge.

DETAILED DESCRIPTION OF THE PREFERRED EMBODIMENTS

The exemplary embodiments of the present invention are described by referring to the accompanying drawings.

(Embodiment 1)

Figure 1:
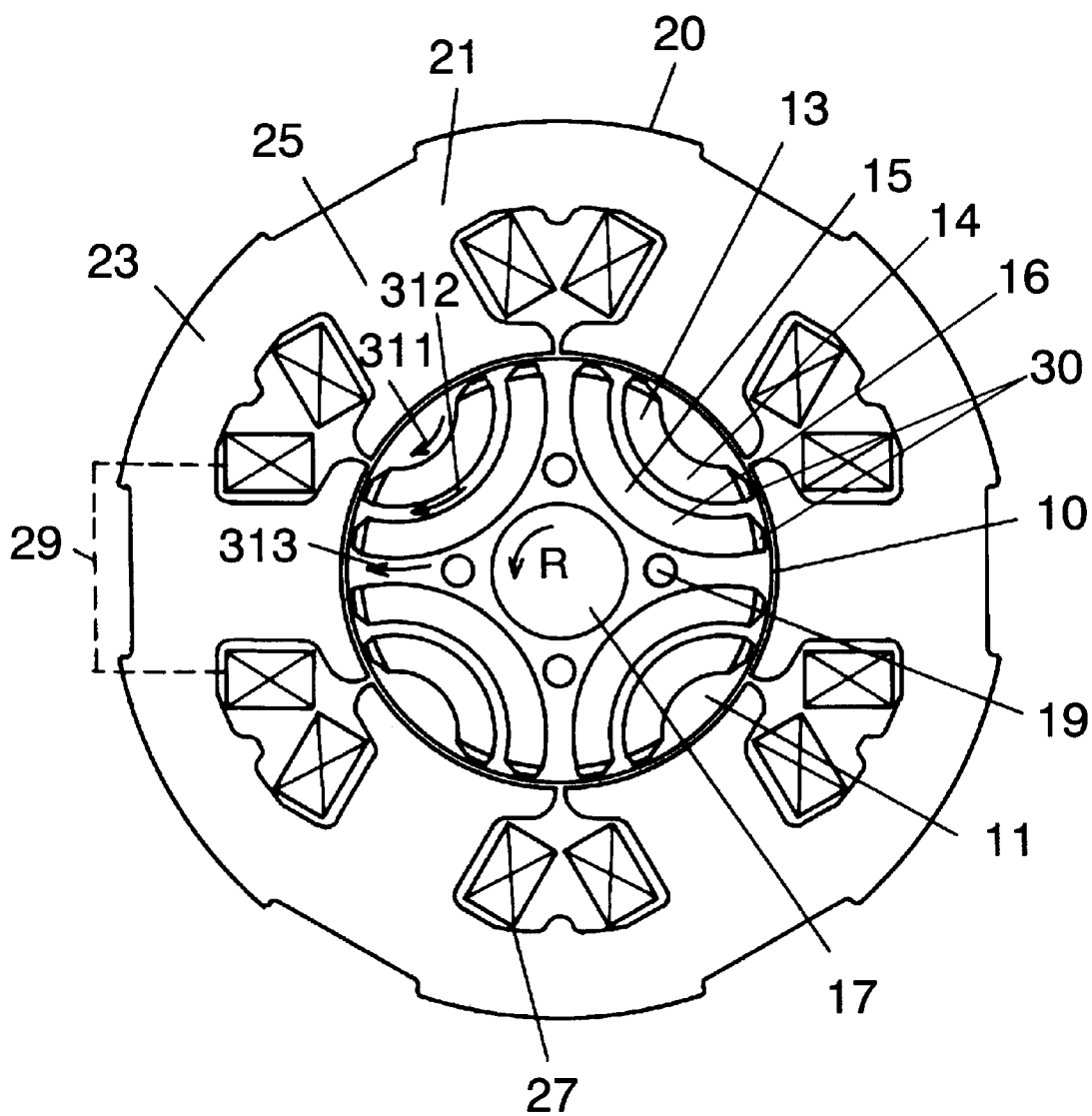
FIG. 1 is a cross section of a motor used in a first exemplary embodiment of the present invention.
Figure 2:
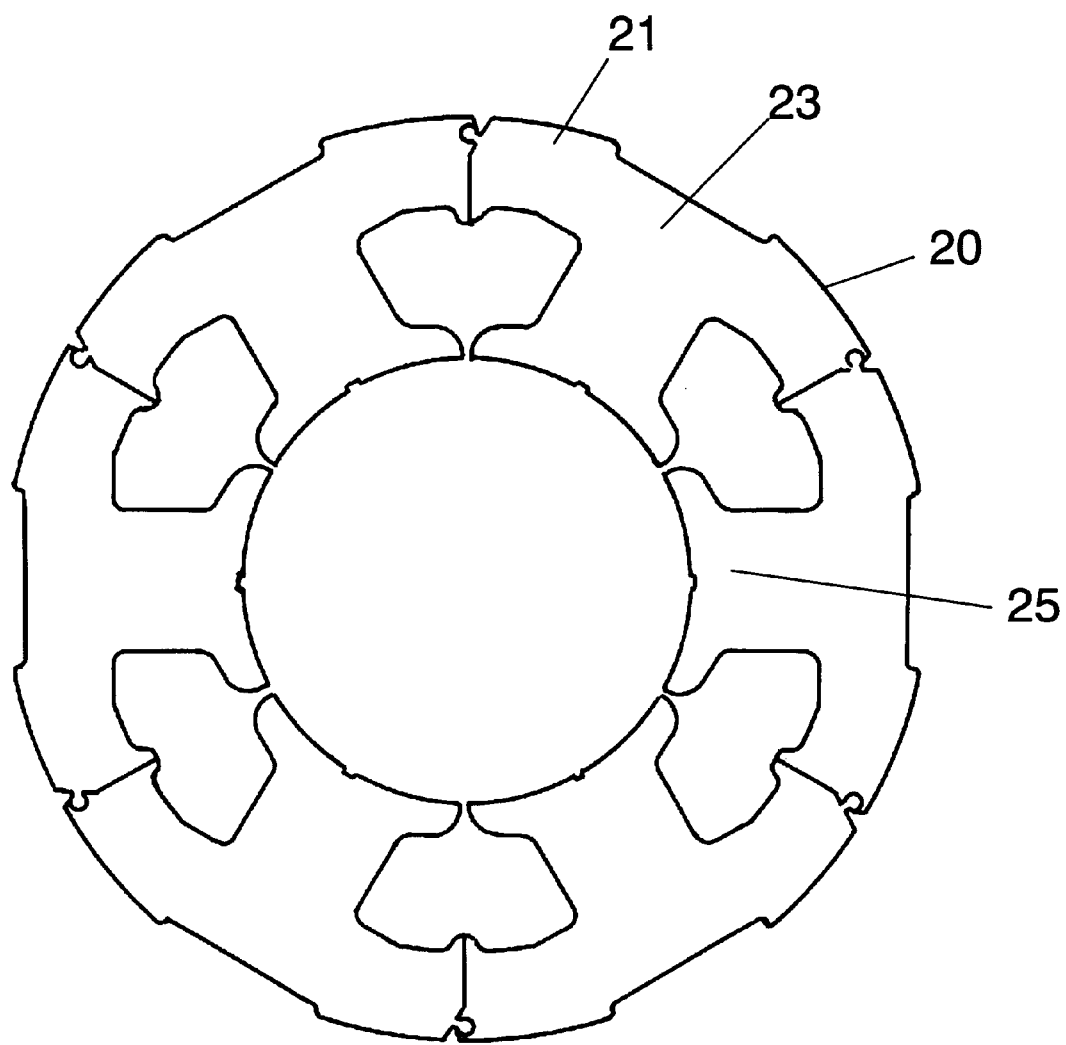
FIG. 2 is an assembly drawing of a stator of the motor shown in FIG. 1.

FIG. 1 is a cross section depicting a motor used in this first exemplary embodiment, and FIG. 2 is an assembly drawing of a stator of the motor shown in FIG. 1.

In FIG. 1, the motor of the present invention comprises rotor 10 and stator 20 facing rotor 10 via an annular space therebetween.

Stator 20 comprises a plurality of teeth 25 and stator core 21 comprising yoke 23 connecting teeth 25, and winding 27 provided on respective teeth 25 with a concentrated winding method.

Rotor 10 comprises the following elements: four sets of permanent magnets 13 and 15 spaced in a layer structure; rotor core 11 comprising stacked electromagnetic sheets, where each set of permanent magnets 13 and 15 is buried within respective rotor poles in the rotor radial direction. Each set of magnets 13 and 15 are placed in such a manner that "S" pole and "N" pole are adjacent to each other. Magnets 13 and 15 in a layer structure are placed such that respective outer sides of magnets 13 facing the outer rim of the rotor have the same polarity as the outer side of the magnets 15 placed nearer to the rotor shaft than the magnets 13.

Magnets 13 and 15 are made of ferrite magnet so that they can be shaped into arc with ease. Magnets 13 and 15 are buried into slits 14 and 16 which extend near to an outer wall of the rotor 10. The ends of slits 14 and 16, i.e. the nearest section of the slits to the outer wall of the rotor 10, form the non-magnetic voids 30. The voids 30 are formed only at the ends of slits 14 and 16. The magnets 13 and 15 thus come into contact with rotor core 11 except their ends facing the voids 30 so that magnetic flux from the magnets 13 and 15 can flow smoothly. Magnets 13 and 15 are shaped as arcs and show their hills toward the rotor center, and the two magnets in the layer structure form substantially concentric circles and lie in parallel. A space between the two magnets is substantially constant.

At the center of rotor core 11, a rotary shaft 17 extends through, and terminal plates (not shown) are fixed on both the end faces of rotor 10 with rivet pins 19.

An operation of the motor having the structure discussed above is described hereinafter.

The rotor 10 is rotated in the direction of "R" shown in FIG. 1 by composite torque of magnet torque and reluctance torque: i.e. the magnet torque is generated by the relation between the magnet field of magnets 13 and 15 and rotating magnetic field produced by the current running through a group of coils 27 provided on respective teeth 25 of the stator 20, on the other hand, the reluctance torque is generated by magnetic paths formed by the rotating magnetic field and appearing on the surface 311 of the rotor 10, on the space 312 between magnets 13 and 15 as well as the space 313 between the poles. In this case, the reluctance torque supplements the magnet torque, and in general, the magnet torque is greater than the reluctance torque.

Figure 19:
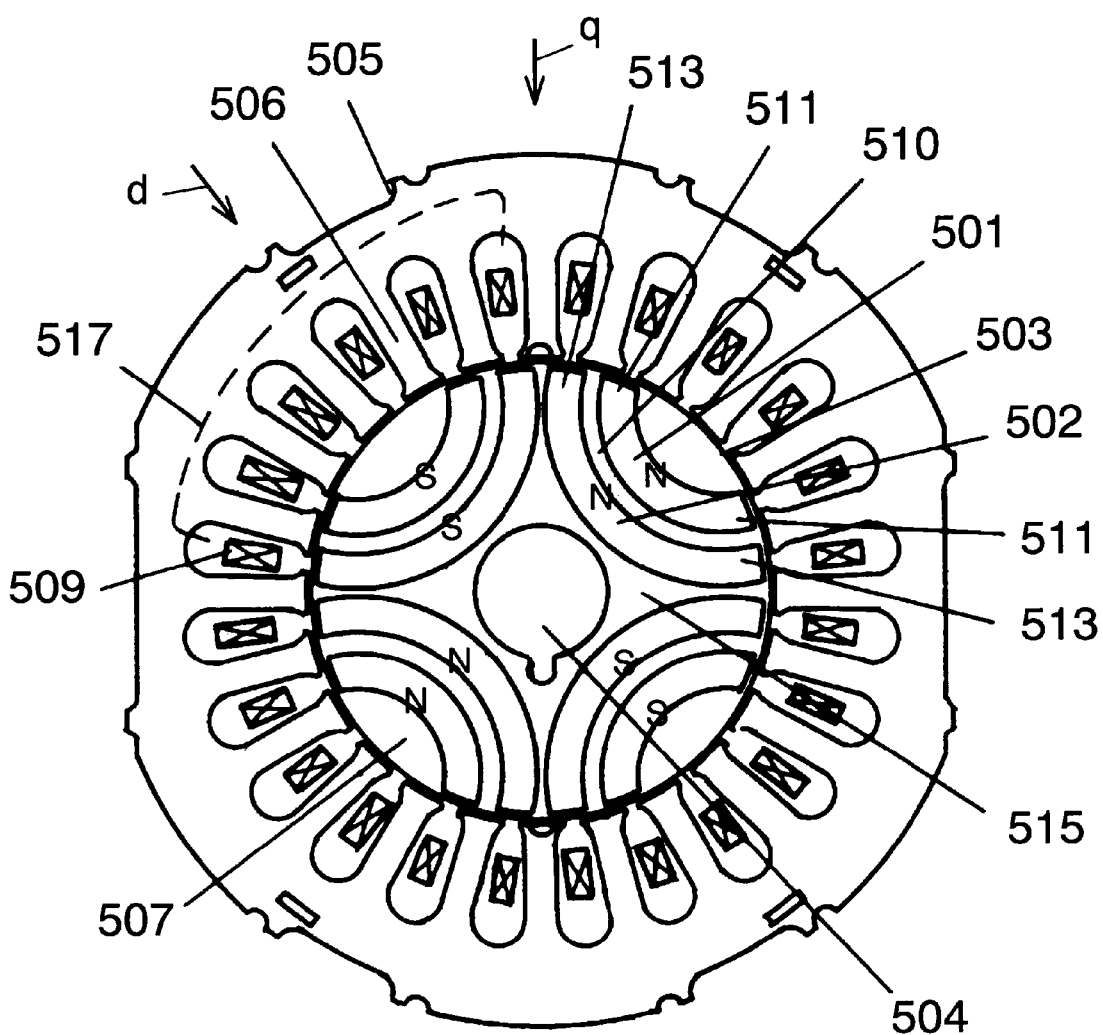
FIG. 19 is a cross section of a motor employing another conventional rotor with interior permanent magnets.

The concentrated windings 27 provided on respective teeth 25 have a lower utilization factor than the distributed windings by approx. 10%, therefore, a number of turns of wire must be increased by approx. 10% from that of the distributed windings. However, even the number of turns of wire is increased by 10%, the wire-wound resistance can be lowered substantially compared with that of the distributed windings because of the following factors. (1) A height of coil-end is lower than that of distributed winding by 40%. (2) A striding length 29 of coil spans the width of only one tooth, on the other hand, a striding length 517 of the distributed winding in 4-pole-rotor covers approx. a quarter of the circle-length at the stator center as shown in FIG. 19. As a result, when a motor with a lower thickness of rotor core 11 must be used because of a limited space, this concentrated winding is preferred because the wire-wound resistance can be substantially reduced, which reduces substantially the copper loss, whereby the efficiency of the motor is increased.

In this first embodiment, since the magnet end is subjected to demagnetization, non-magnetic voids 30 are provided to the ends of magnets 13 and 15. The voids 30 formed between magnet-ends and the outer wall of rotor 10 can be a flux barrier in the magnetic path shorting the adjacent poles of rotor 10, and restrain the magnetic-flux-short. Magnetic flux running between the adjacent teeth passes the void 30, thereby reducing demagnetization field over the magnets 13 and 15. Instead of forming voids 30, non-magnetic material such as resin can be buried. In this case, the strength of rotor 10 can be increased.

As shown in FIG. 2, stator core 21 is divided into teeth 25, and after teeth 25 are wound by coil, teeth 25 are assembled into stator 20 by press-fit or welding. This manufacturing method allows the coil to be wound with ease and in high density. Further, a heavy conductive wire can be used for winding the teeth 25, thereby substantially reducing the wire-wound-resistance.

On the condition that the following two motors would generate the same value of induced voltage, one motor with the distributed winding and another motor with the concentrated winding are compared. The comparison result tells that when a number of turns of wire per phase of the concentrated winding is as much as 110% and the coil diameter measures 103% across of those of the distributed winding, and the line resistance of the concentrated winding is as little as approx. 60% of the distributed winding.

In a motor with the concentrated winding, of which stator core has a thickness of as half as the stator diameter, the total length of the motor including the coil ends measures approx. 25% less than that of a motor with the distributed winding. The ratio of a number of teeth vs. a number of poles is preferably 3:2.

The motor in accordance with the first exemplary embodiment provides non-magnetic sections, i.e. voids 30, between the outer wall of rotor 10 and the ends of magnets 13 and 15. This arrangement can prevent magnetic flux produced by the demagnetization field running in volume between the adjacent teeth 25 from flowing to the ends of magnets 13 and 15. Further, the presence of the non-magnetic sections allows the magnets 13 and 15 to be apart from the outer wall of rotor 10 so that the magnetic flux running between the adjacent teeth less affects the magnets 13 and 15. The non-magnetic section is placed between the outer wall of rotor 10 and the ends of both magnets 13 and 15. This arrangement leaves no need for the magnets to be extended close to the outer wall of the rotor, and makes the salient-pole-rate same as the rotor where the magnets extends close to the outer wall of the rotor. The salient-pole-rate is $L_d/L_q$ (inductance along "d" axis vs. that of along "q" axis.)

In other words, the comparison of a conventional motor, in which permanent magnets extend close to the outer wall of the rotor, with the motor of the present invention, in which non-magnetic sections are formed at the ends of magnets, proves the following result. The conventional motor is subjected to the demagnetization at the ends of magnets, the magnetic flux volume is thus decreased from the initial stage in step with repetitive use, whereby output torque is changed. The motor in accordance with the first embodiment is, on the other hand, free from influence of the demagnetization because of forming non-magnetic-sections at the ends of magnets, so that a constant volume of magnetic flux and a stable torque are expected.

(Exemplary Embodiment 2)

Figure 3:
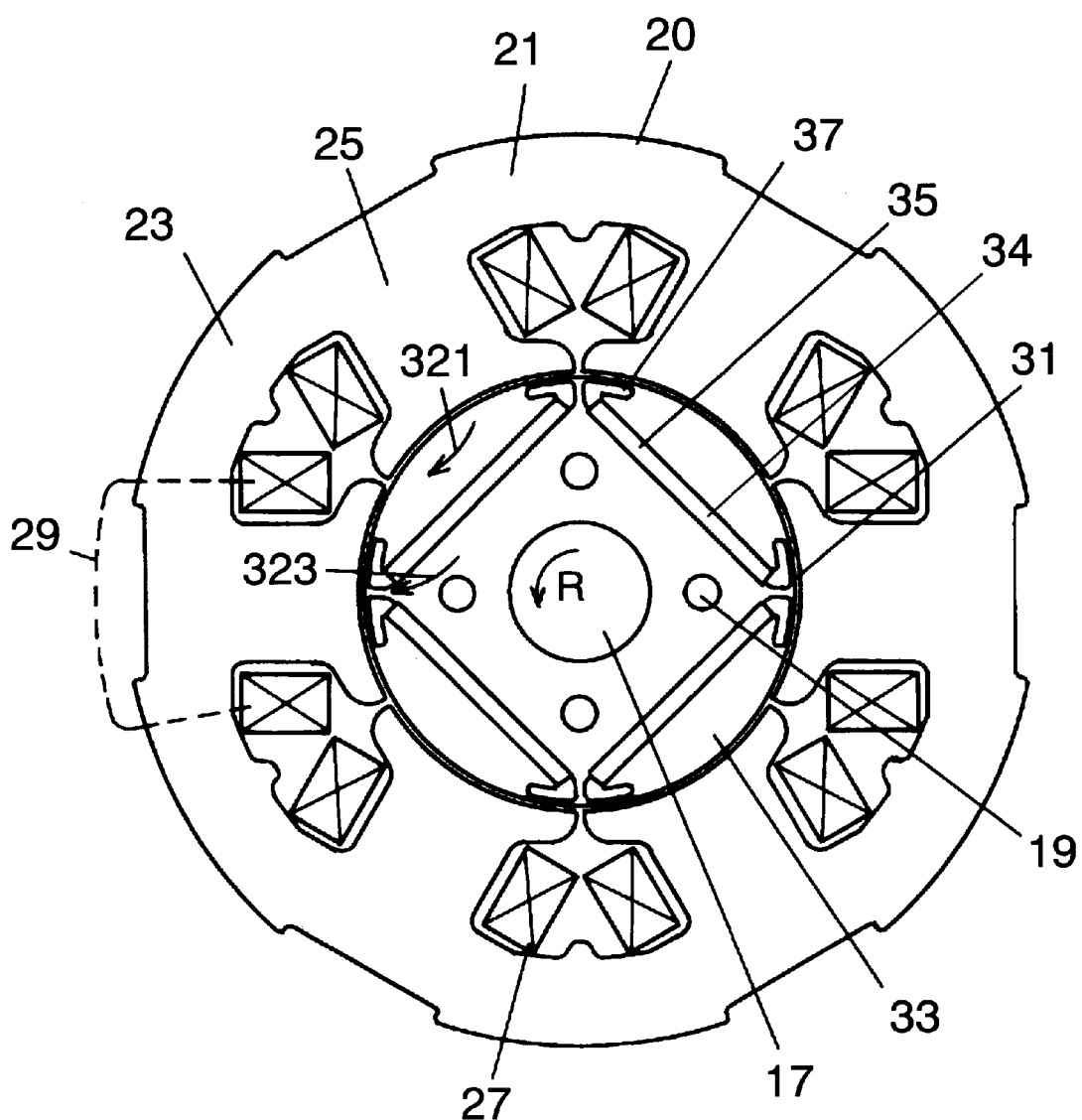
FIG. 3 is a cross section of a motor used in a second exemplary embodiment of the present invention.

FIG. 3 is a cross section of a motor in accordance with the second exemplary embodiment of the present invention.

In FIG. 3, rotor 31 comprises the following elements: four plates of permanent magnets 35; and rotor core 33 comprising stacked electromagnetic sheets. Each permanent magnet 35 is buried within rotor core 33 transversely with the rotor radial direction. Each magnet 35 is placed in such a manner that "S" pole and "N" pole are adjacent to each other. Non-magnetic sections 37 are formed at the ends of respective magnets 35 in order to restrain the demagnetization due to magnetic flux running between the adjacent teeth 25. The magnet 35 comprises rare-earth-magnet of which residual-magnetic-flux-density is 1.1–1.4T (tesla.)

An operation of the rotor having the structure discussed above is described hereinafter. Rotor 31 is rotated in the direction of "R" shown in FIG. 3 by composite torque of magnet torque and reluctance torque: i.e. the magnet torque is generated by the relation between the magnet field of magnets 35 and rotating magnetic field produced by the current running through a group of coils 27 provided on respective teeth 25 of stator 20, on the other hand, the reluctance torque is generated by magnetic paths 321 and 323 formed by the rotating magnetic field and appearing on the surface of rotor 31 as well as space between the poles.

Since magnet 35 employs rare-earth-magnet, it produces greater volume of magnetic flux than a ferrite magnet. The thickness of rotor core 33 can be lessened from that of ferrite magnet by 20–60%. Further, the concentrated winding method realizes a lower height of coil end than the distributed wiring method. As a result, a motor smaller in axial direction than the conventional motor can be achieved. Since magnet 35 is shaped as a plate, inexpensive cost can be expected.

Figure 4:
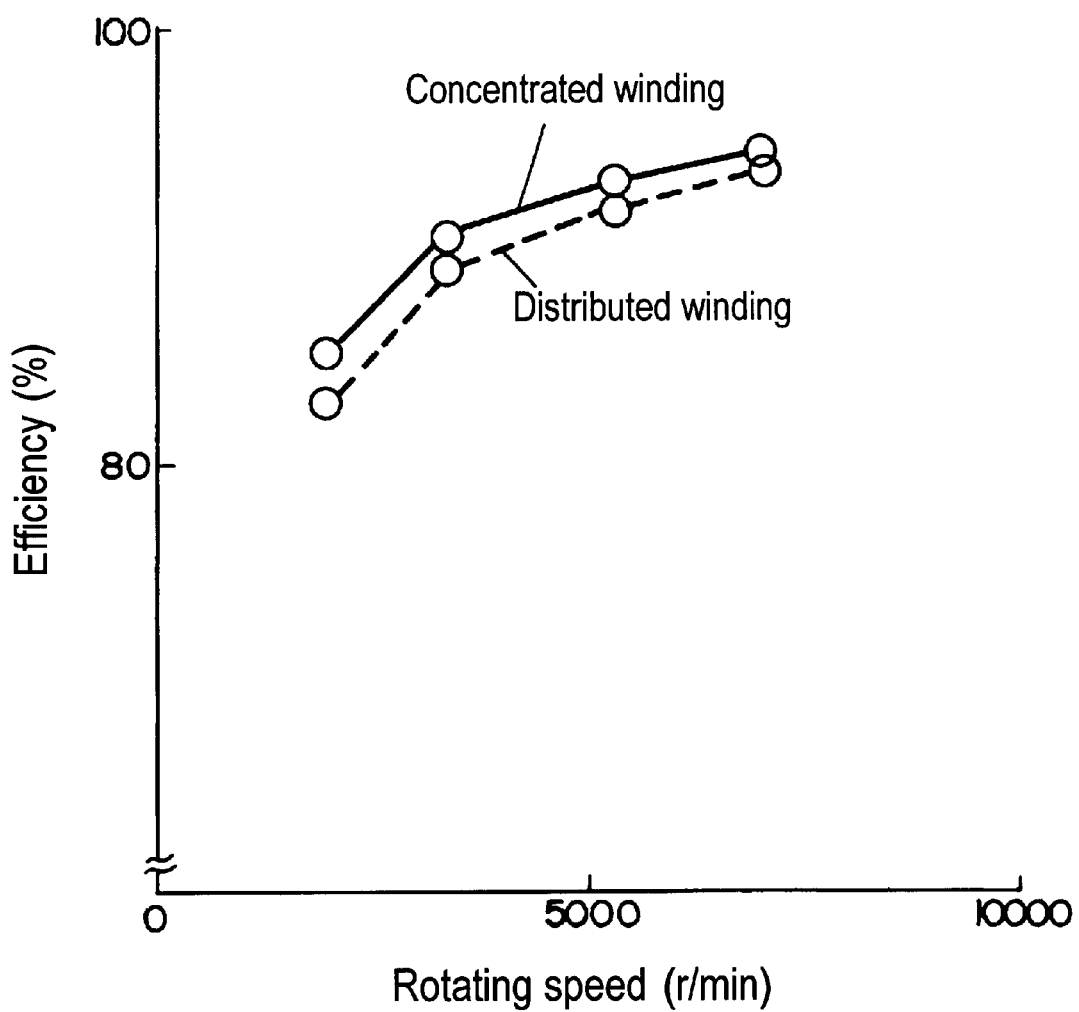
FIG. 4 illustrates a relation between rotational speeds and motor efficiency of the motor shown in FIG. 3 with a concentrated winding and a distribute winding.

FIG. 4 illustrates relations between rotational speeds and efficiencies of the motor used in the second embodiment with a concentrated winding and a distributed winding. In FIG. 4, a solid line shows a relation between the rotating speed and efficiency of the motor with the concentrated winding used in the second embodiment. A broken line shows a relation between the rotating speed and efficiency of the motor using the same rotor as used in the motor discussed just above and the stator with the distributed winding that is designed to produce the induced voltage and core-magnetic-flux-density both identical to those in the motor discussed just above. Both the lines represent the values measured at the same load torque. The motor used in the second embodiment proves an increase in efficiency by 0.5–2% comparing with the concentrated winding type motor, and the efficiency difference increases at lower rotating speeds.

Figure 5:
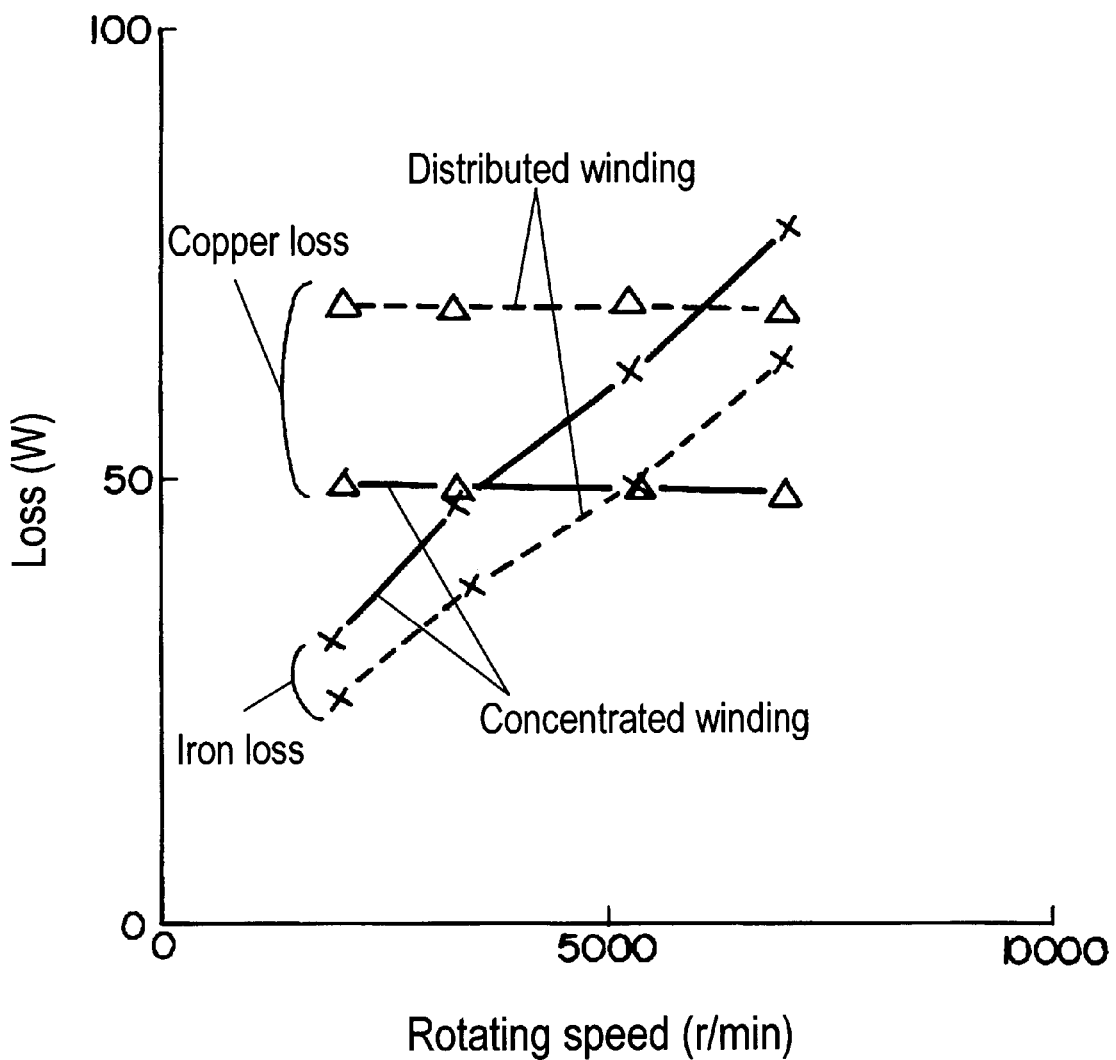
FIG. 5 illustrates a relation between rotational speeds and loss of the motor shown in FIG. 3 with the concentrated winding and distributed winding.

FIG. 5 shows the relations between the rotating speed and loss in the concentrated and distributed windings on the same condition as discussed above. In FIG. 5, in a case of the same torque, copper loss is approx. constant regardless of the rotating speeds; however, iron loss increases proportional to the rotating speed. Accordingly, the difference in copper loss influences greater at lower rotating speeds where iron loss appears a little, and as a result, difference in efficiency between the concentrated winding and distributed winding becomes greater.

In general, a power supply frequency for realizing the same rotating speed increases at a greater number of poles. On the other hand, iron loss consists of eddy-current-loss and hysteresis loss. The eddy-current-loss is proportional to the frequency squared, and the hysteresis loss is proportional to the frequency.

In this second embodiment, the increase of iron loss exceeds the decrease of copper loss when a number of rotor poles is six or more, which lowers the efficiency. When the rotor has two poles, electric angles formed by "N" pole and "S" pole are 120° and 240°, and the attraction force of the rotor is inclined to the adjacent section of "N" and "S" poles, both poles are produced on the stator by electric current. The rotor then encounters severe eccentricity. The second embodiment thus employs four poles in rotor. In the case of four poles, two pairs of "N" and "S" poles are available, and the two pairs are well balanced. When the efficiency, noises and vibrations of the motor are taken into consideration, four-pole-rotor is the best choice. Further, arc-shaped magnets would produce greater volume of magnetic flux, and allow the motor to be further downsized.

The construction of rotor 31 in accordance with the second embodiment is detailed hereinafter.

Rotor core 33 comprises the axially stacked rotor-core-sheets in the same shape and made of electromagnetic-steel-sheets. Four plate-type permanent magnets are buried within the rotor core 33 at right angles to the radial direction of the rotor. Each magnet lies adjacent to each other such that "S" pole and "N" pole lie alternately. Non-magnetic sections 37 are provided to ends of respective magnets 35 in order to restrain the demagnetization due to the running flux between the adjacent teeth 25.

Non-magnetic section 37 represents long hole 37 or a void bored in contact with the ends of respective magnets 35. Long holes 37 communicate with the slits 34 where the permanent magnets are positioned, and the shape of holes 37 keep the same throughout the thickness of rotor core. End plates (not shown) are disposed on both ends of rotor core, and the plates are fixed with rivet pins 19 through the holes so that the rotor core 33 per se can be secured and magnets 35 can be also secured within the rotor core 33. Rotary shaft 17 is press-fitted in the rotor-core-center, and the rotor 31 spins on shaft 17.

Burying magnets 35 within rotor core 33 can eliminate stainless-steel-pipes that have covered the outer wall of rotor in order to prevent permanent magnets from coming away from the outer wall of the rotor core in a conventional style. This elimination can narrow magnetic space between the rotor and stator, and also decrease the loss of due to eddy current running on the pipe. Further, the construction used in the second embodiment produces the reluctance torque that can be utilized. Thanks to these advantages, the motor in accordance with the second embodiment can be a highly efficient motor.

In this second embodiment, rotor 31 is difficult to be skewed, in particular, when sintered magnets are buried within rotor core 33. In this case, there is no way to skew the rotor but to enlarge slit 34. Skewing the rotor further decreases noises and vibrations at spinning, and it is practiced in the following manner: rotor-core-sheets are stacked by shifting an angle little by little in the circumferential direction of shaft 17, thereby forming rotor core 33. If slits 34 are enlarged for skewing the rotor, voids are produced between the pole faces of respective magnets 35 and rotor core 33, which lowers permeability. As a result, the efficiency of motor is lowered. As discussed above, the second embodiment leaves some difficulties in further lowering noises and vibrations; however, these difficulties are overcome by the following exemplary embodiments.

(Exemplary Embodiment 3)

Figure 6:
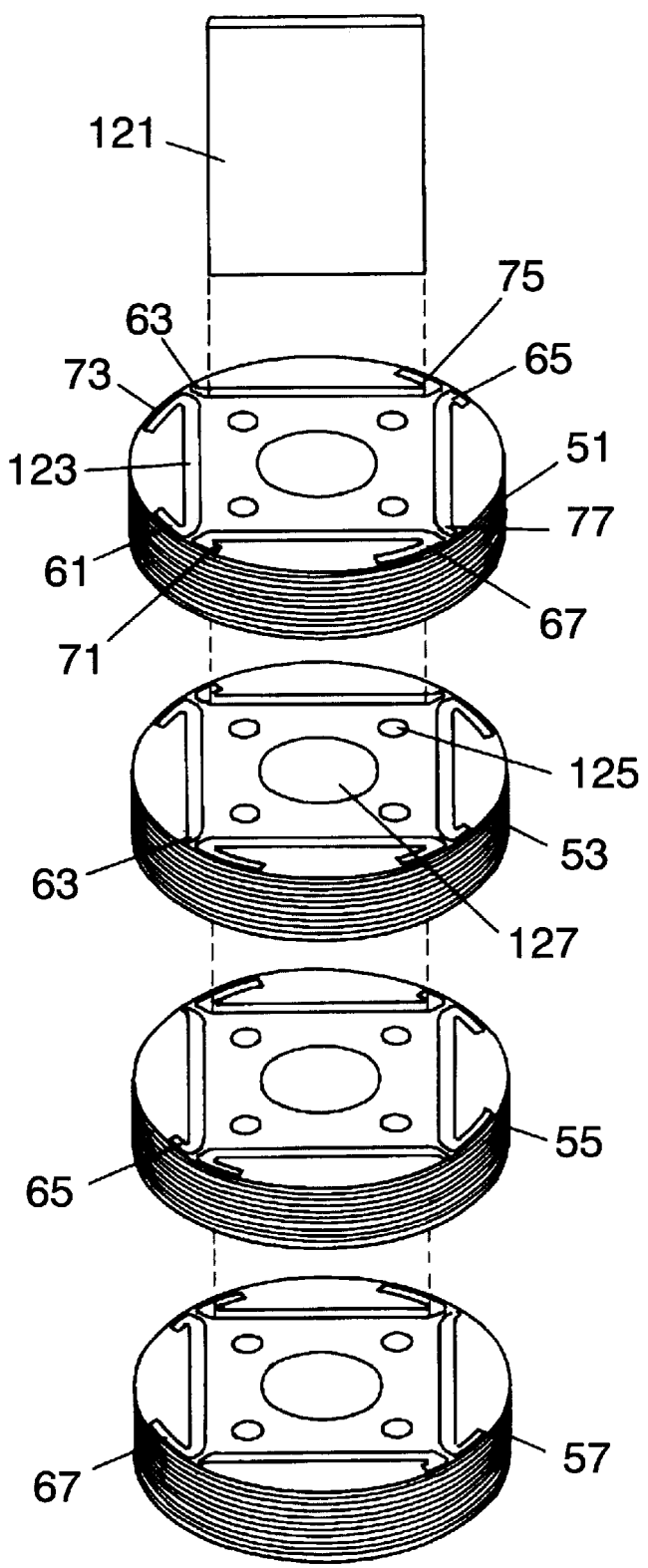
FIG. 6 is an exploded perspective view of a rotor of a motor used in a third exemplary embodiment of the present invention.
Figure 7:
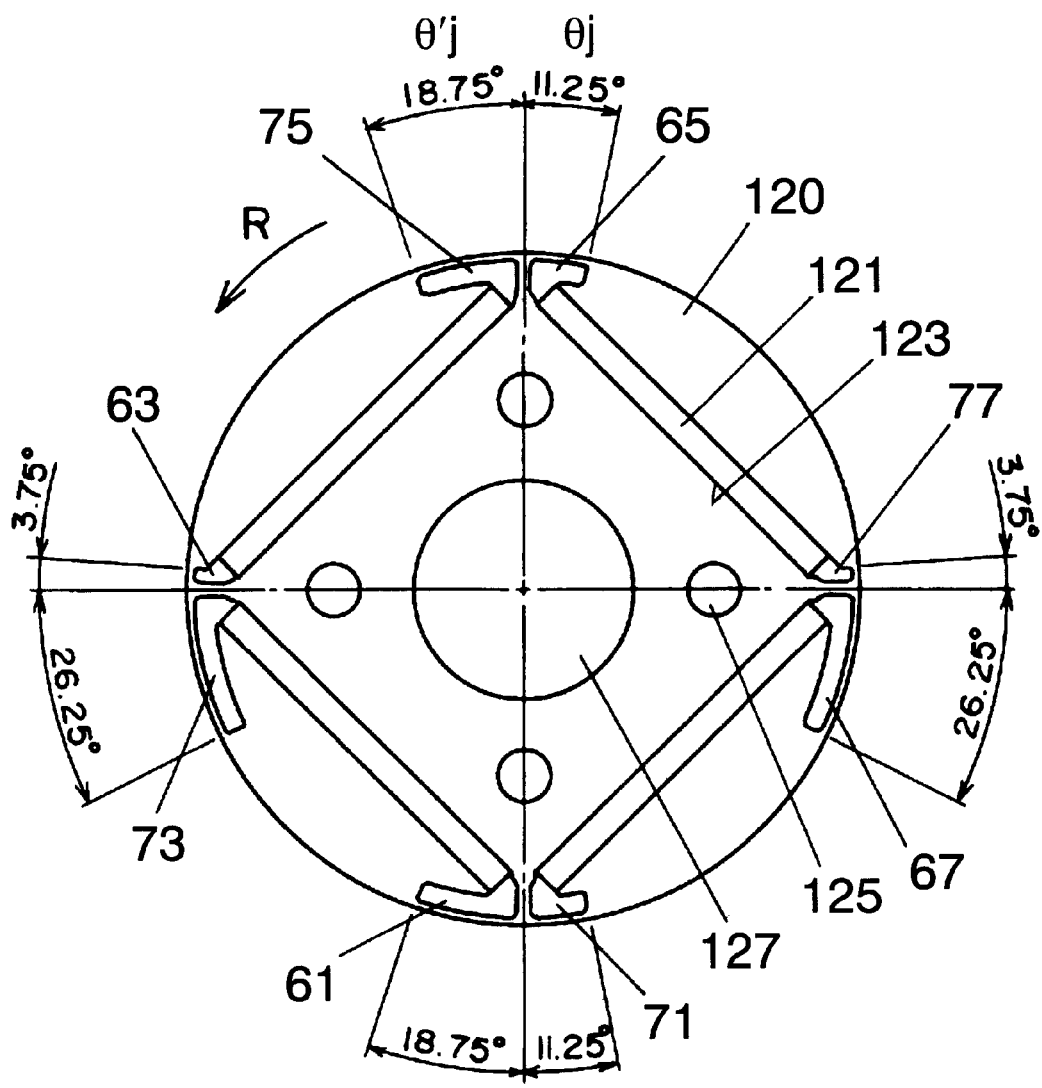
FIG. 7 is a cross section of the rotor shown in FIG. 6.

FIG. 6 is an exploded perspective view of a rotor of motor in accordance with the third exemplary embodiment. FIG. 7 is a cross section of the rotor shown in FIG. 6. FIG. 8 illustrates a principle how to decrease the cogging torque and torque ripple.

In FIG. 6–FIG. 8, electromagnetic steel plate is punched out to circular shape, and this circular shaped rotor-core-sheets are stacked to form rotor cores 51, 53, 55 and 57. Permanent magnets 121 are buried within these rotor cores. Non-magnetic long holes 61, 63, 65, 67, 71, 73, 75 and 77 are provided in contact with ends of magnets 11. The rotor formed in such a way has four poles.

When the rotor spins in "R" direction as shown in FIG. 7, forehand long hole 61, 63, 65 and 67 in the spinning direction of rotor form an angle "θj" with regard to a pole boundary. The angle of "θj" takes four values, namely, a number of stator-slots (teeth) of stator is 12 (3×number of pole=4), and distributed winding is employed. Thus "θj" takes 3.75°, 11.25°, 18.75°, and 26.25°. Rotor cores 51, 53, 55 and 57 are stacked by shifting 90° each. Approx. a quarter of total thickness of rotor is distributed to each rotor core.

The "j" the tail-end long holes 71, 73, 75 and 77 forms an angle "θ'j" with regard to the pole boundary. The angle "θ'j□ takes 26.25°, 18.75°, 11.25°, and 3.75°. Thus "θj"+"θ'j□=30° is established. In the meantime, the tail-end long holes discussed above are defined as follows: a tail-end long hole of a rotor pole followed by the forehand long hole of a following rotor pole in the rotating direction. When the rotor cores 51, 53, 55 and 57 are stacked, the forehand long hole or the tail-end long hole of a pole in the rotating direction can have four kinds of shape. The values taken by "θj" and "θ'j" do not necessarily follow the sequence discussed above.

A principle how to decrease torque ripple is described hereinafter with reference to FIG. 8A–FIG. 8D. These FIGS. illustrate relations between the long hole and teeth at a pole-boundary on the same rotor position.

Figure 8A:
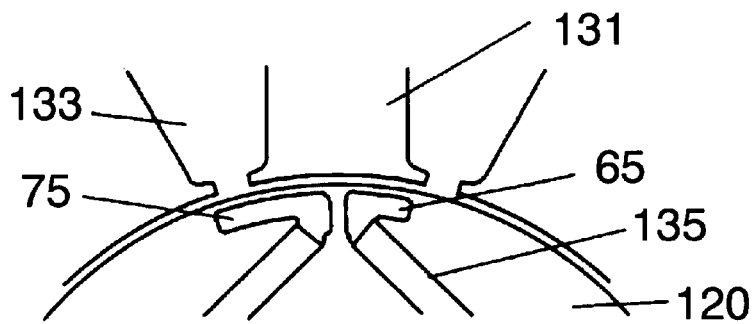
FIG. 8A–FIG. 8D illustrate a principle of the rotor shown in FIG. 6.
Figure 8B:
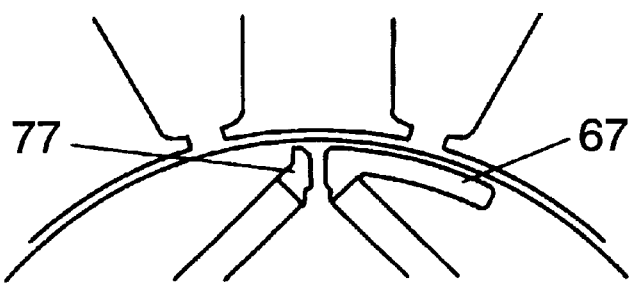
Figure 8C:
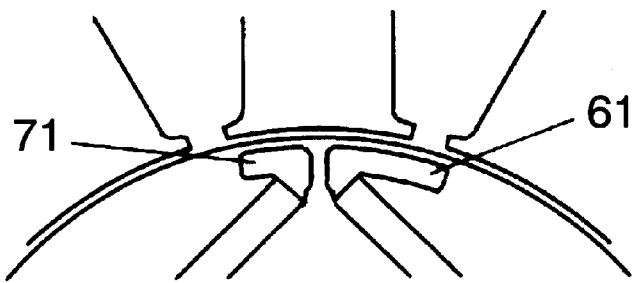
Figure 8D:
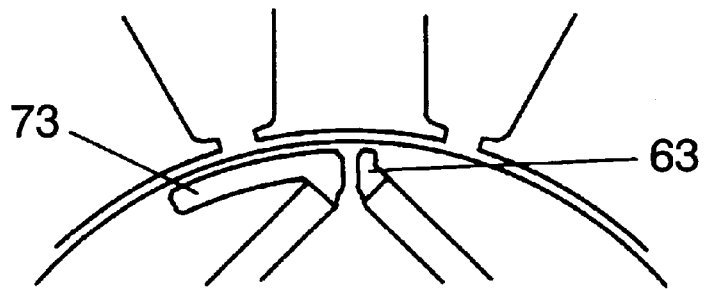

In FIG. 8A, magnetic flux supplied from pole face 135 travels to teeth 131 of the stator along long hole 65 in rotating direction. However, stator-slots 133 have a great magnetic resistance.

Positional relation between long holes 61, 63, 65, 67 and stator-slots is available in four ways at the same rotor position. In other words, the tips of respective long holes define ca. one fourth each of the space between the adjacent teeth. Therefore, the magnetic flux travelling from the tips of respective long holes to the teeth passes the stator-slot every 7.5° i.e. 360°/(number of teeth=12×4)=7.5°. If all the long holes were in the same shape, the magnetic flux travelling from the tips to the teeth passes the stator slot every 30° i.e. 360°/(number of teeth=12)=30°. This third embodiment thus produces as much as four times ripples comparing with the rotor having the same shapes of the long holes. The ripple amount is therefore reduced to ca. one quarter.

The Japanese Patent Application No. H09-195379 by the same inventors of the present invention discloses that when "θj"+"θ'j"=30° is established, the torque is maximized and the cogging torque is minimized. It also teaches that the presence of the long holes can decrease the flux volume that shorts a positive pole face to a negative pole face.

The construction of the third exemplary embodiment allows the rotor-core-sheet to have only one shape, which saves a tooling-die cost, and the rotor to be provided with pseudo skewing easily free from increasing a number of magnets, thereby lowering noises and vibrations.

In this embodiment, the pole boundary is defined with even extent, i.e. 90°, and teeth are positioned with even spaces. The long hole, where "θj" or "θ'j□ takes minimum values, may receive a magnet in the long hole.

Magnetic flux may leak from both ends of rotor in the axial direction, rotor cores 51 and 57 positioned at the ends of rotor are desirably slightly thicker than other cores 53 and 55. The thickness difference between these two types of rotor cores is desirably not less than 0.5 mm when dimensional errors of stacked thickness and magnet shape are taken into consideration, and not more than 2.5 mm when the leakage flux volume is taken into consideration.

(Exemplary Embodiment 4)

Figure 9:
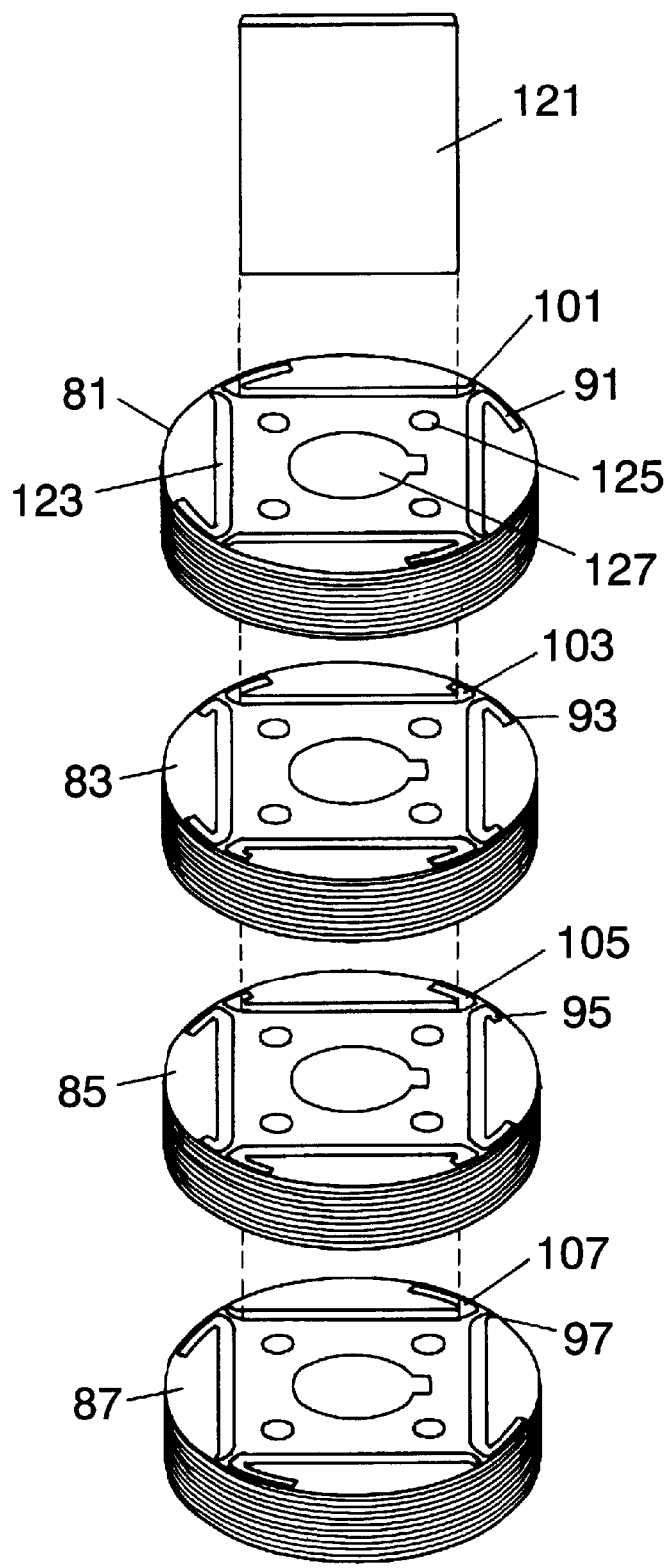
FIG. 9 is an exploded perspective view of a rotor of a motor used in a fourth exemplary embodiment of the present invention.
Figure 10A:
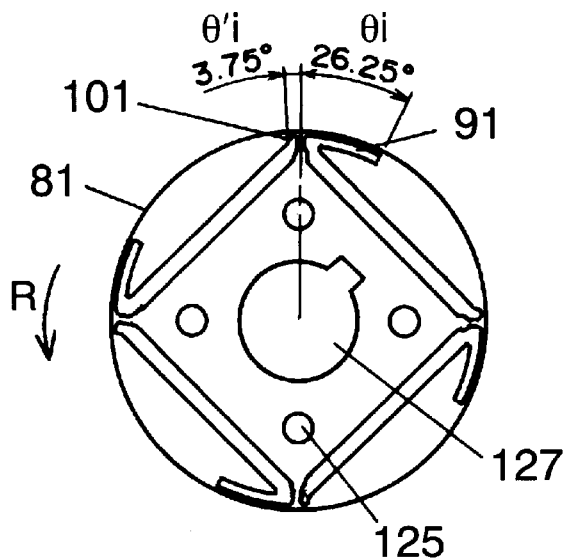
FIG. 10A–FIG. 10D are cross section of the rotor shown in FIG. 9.
Figure 10B:
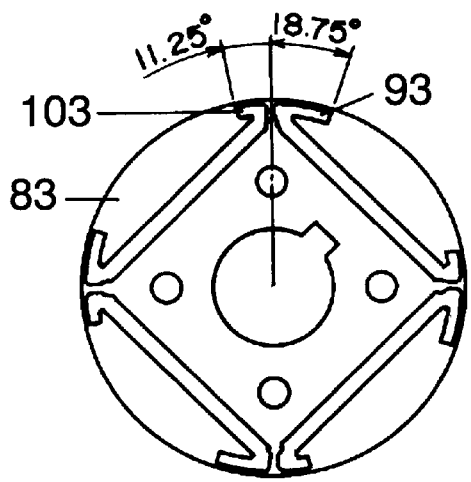
Figure 10C:
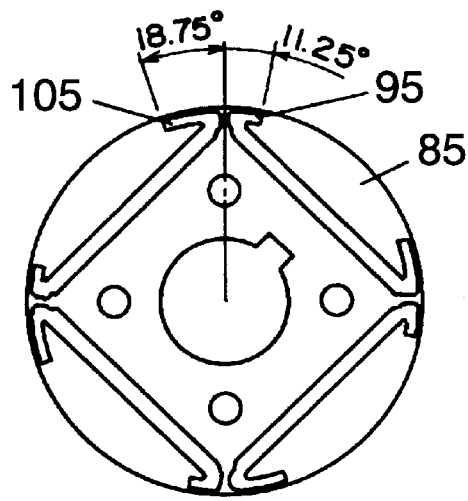
Figure 10D:
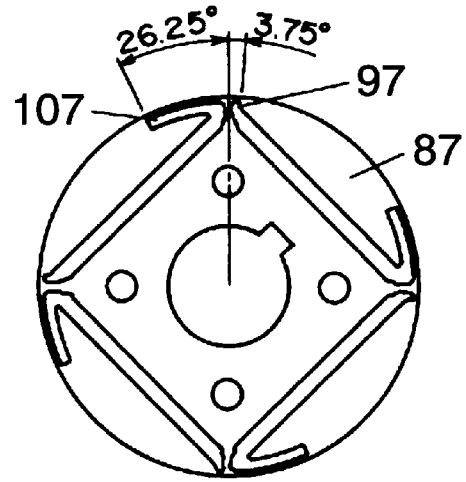

FIG. 9 is an exploded perspective view of a rotor of motor in accordance with the fourth exemplary embodiment of the present invention. FIG. 10A–FIG. 10D are cross sections of the rotor shown in FIG. 9. Further, FIG. 11A–FIG. 11D illustrate a principle how to decrease cogging torque and torque ripple of the same rotor.

Regarding the construction and operation of the fourth embodiment, the description of the same content as the third embodiment is omitted here.

In the third embodiment previously discussed, a long hole of rotor core has one shape as shown in FIG. 7. In this fourth embodiment, four shapes of rotor core are available, i.e. rotor core 81, 83, 85 and 87 responsive to shapes of the long holes. A number of stator-slots (a number of teeth) is 6, i.e. 3/2×(number of rotor pole=4), and a concentrated winding method is employed.

The four poles have the same long-hole-shape in the rotating direction in respective rotor cores. Assume that the rotor rotates in the direction "R" shown in FIG. 10A. When forehand long holes 91, 93, 95 and 97 form an angle "θi" with regard to a pole boundary, the angle "θi" takes four values, namely, "θi"=3.75°, 11.25°, 18.75°, and 26.25°. The tail-end long holes 101, 103, 105 and 107 form an angle "θ'i" with regard to the pole boundary. The angle "θ'i□ takes 26.25°, 18.75°, 11.25°, and 3.75°. Thus "θi"+"θ'i□=30° is established. In the meantime, the tail-end long holes discussed above are defined as follows: a tail-end long hole of a rotor pole followed by the forehand long hole of a following rotor pole in the rotating direction. A quarter of the total rotor-thickness is distributed to respective stacked thickness of rotor core 81, 83, 85 and 87.

When these rotor cores are stacked, four shapes are available to the forehand long hole or the tail-end long hole of a rotor pole in the rotating direction of the rotor. The values taken by "θi" and "θ'i□ do not necessarily follow the sequence discussed above. In other words, "θi" in this fourth embodiment takes 26.25°, 18.75°, 11.25°, and 3.75° in this order; however, the order can be changed arbitrarily. Shape patterns are not limited to four but the numbers can be increased at greater effect on lowering the torque ripples.

Figure 11A:
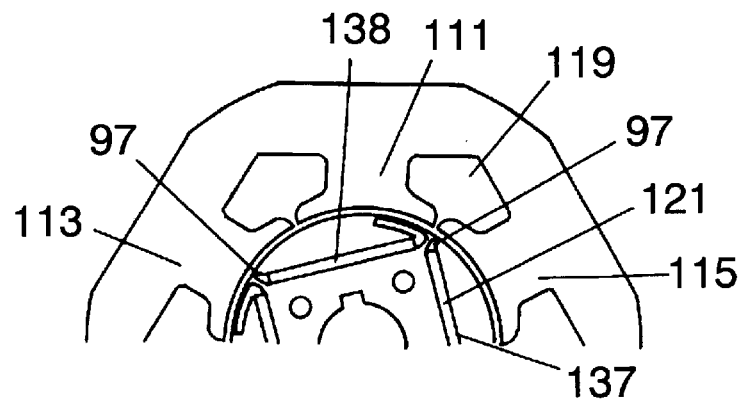
FIG. 11A–FIG. 11D illustrate a principle of the rotor shown in FIG. 9.
Figure 11B:
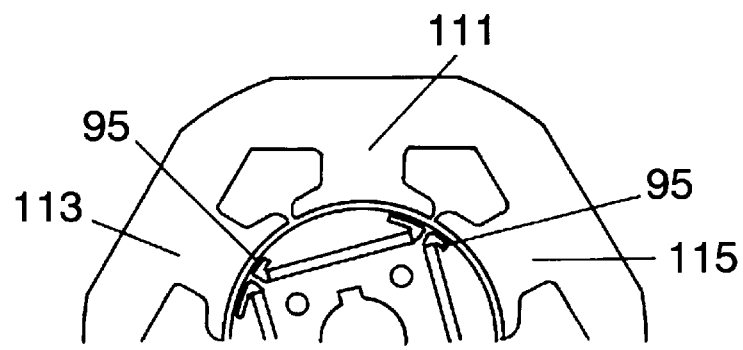
Figure 11C:
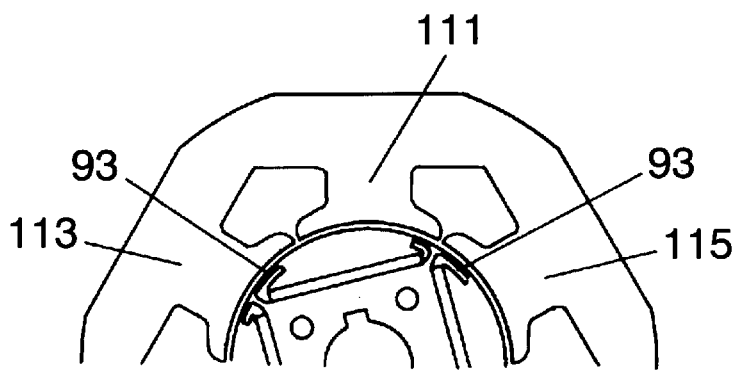
Figure 11D:
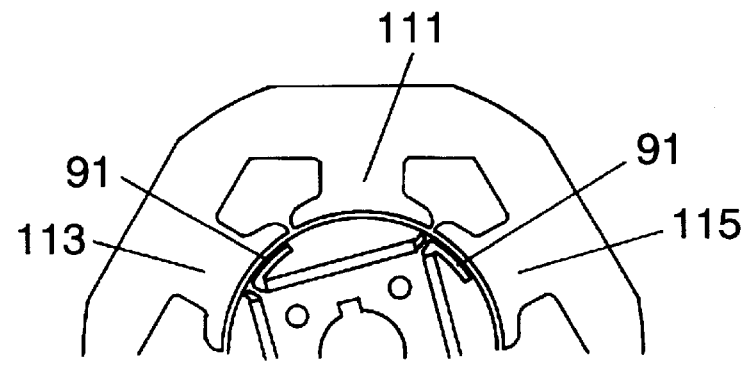

A principle how to decrease torque ripple is described hereinafter with reference to FIG. 11A–FIG. 11D. These FIGS. illustrate relations between the long hole and teeth on the same rotor position. In FIG. 11A, magnetic flux supplied from pole face 137 travels to teeth 111 or 115 of the stator along long hole 97 in rotating direction "R". However, stator-slot 119 has a great magnetic resistance. In the same manner, magnetic flux supplied from pole face 138 travels to teeth 113 along long-hole 97 in rotating direction "R". The positional relation between the teeth and long-hole 97 in contact with pole-face 138 is shifted by 30° from the locating relation between the teeth and long-hole 97 in contact with pole-face 137.

In the same manner, eight patterns are available in the locating relation between stator-slots and long-holes 91, 93, 95 and 97 on the same rotor position. The tips of respective long-holes define one eighth each of the angle extent 60° between the adjacent teeth. Accordingly, the flux travelling from the tip of long hole passes the stator-slot every 7.5°.

This fourth embodiment thus produces as much as four times ripples comparing with the case where the rotor has the same shapes of the long holes and the flux passes the stator slots every 30°. The ripple amount is therefore reduced to ca. one quarter.

The Japanese Patent Application No. H09-195379 by the same inventors of the present invention discloses that when "θi"+"θ'i□=30° is established, the torque is maximized and the cogging torque is minimized. It also teaches that the presence of the long holes can decrease the flux volume that shorts a positive pole face to a negative pole face.

Since the long holes have the same shape on the same core-sheet, no imbalance occurs in the radial direction.

(Exemplary Embodiment 5)

Figure 12:
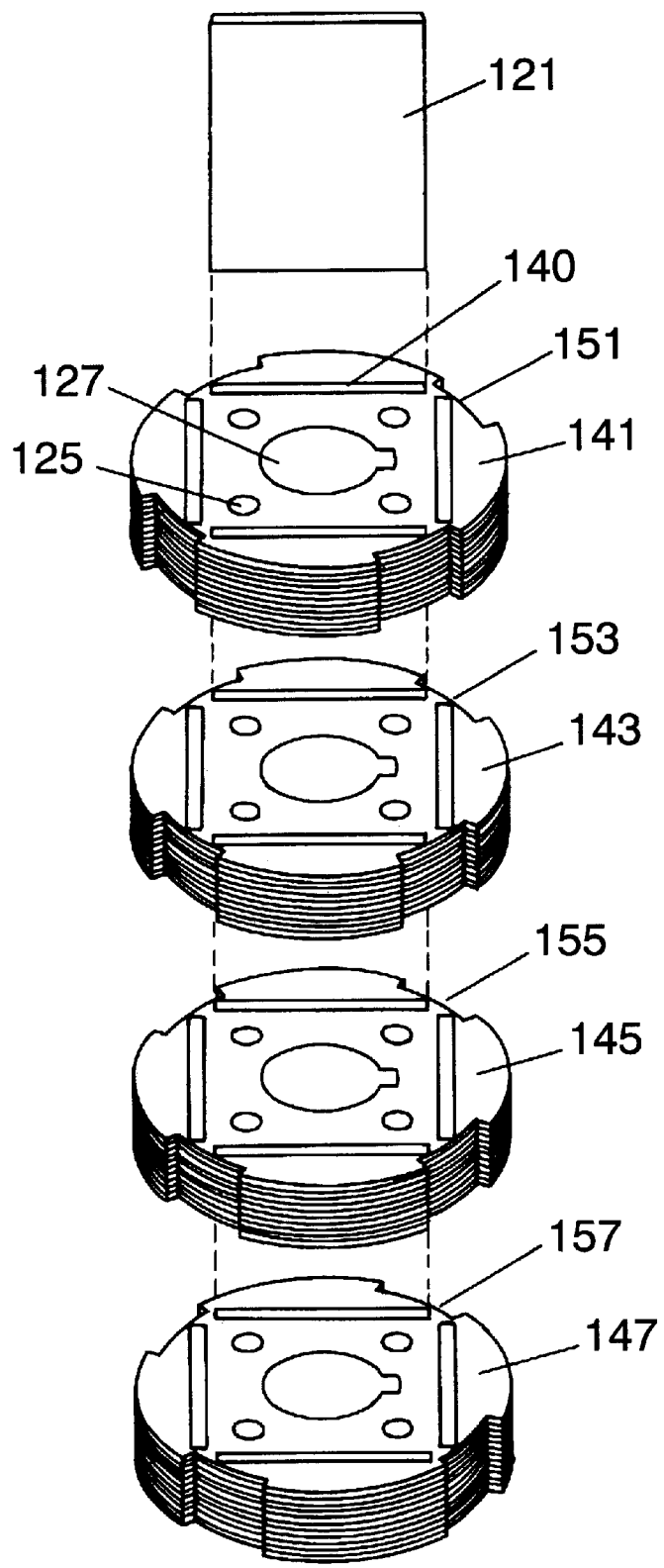
FIG. 12 is an exploded perspective view of a rotor of a motor used in a fifth exemplary embodiment of the present invention.

FIG. 12 is an exploded perspective view of a rotor of motor in accordance with the fifth exemplary embodiment of the present invention. FIG. 13A–FIG. 13D are cross sections of the same rotor.

Regarding the construction and operation of this fifth embodiment, the description of the same content as the fourth embodiment is omitted here.

Four-poles rotor having notches 151, 153, 155 and 157 are used in this embodiment. The notches are provided on a rotor circumference where the ends of permanent magnet 121 are closely placed.

Four types of rotor cores, 141, 143, 145 and 147 are available depending on the locations of notches as shown in FIG. 13A–FIG. 13D. A number of stator-slots (=number of teeth) are 6 or 12, i.e. (3/2)×number of poles, 4, or (3×number of poles, 4.)

Figure 13A:
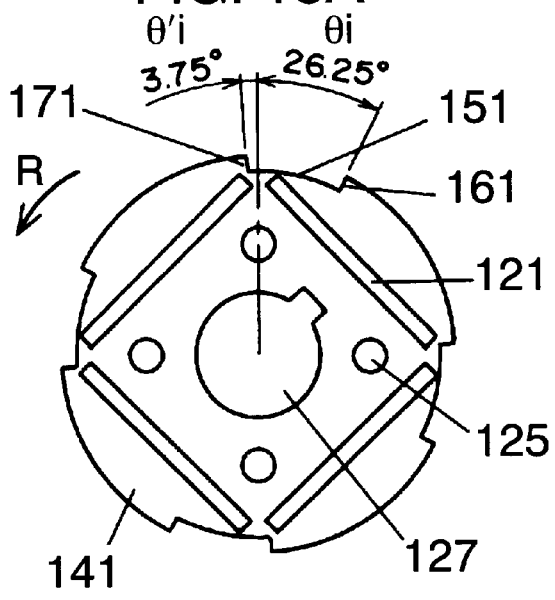
FIG. 13A–FIG. 13D are cross sections of the motor shown in FIG. 12.
Figure 13B:
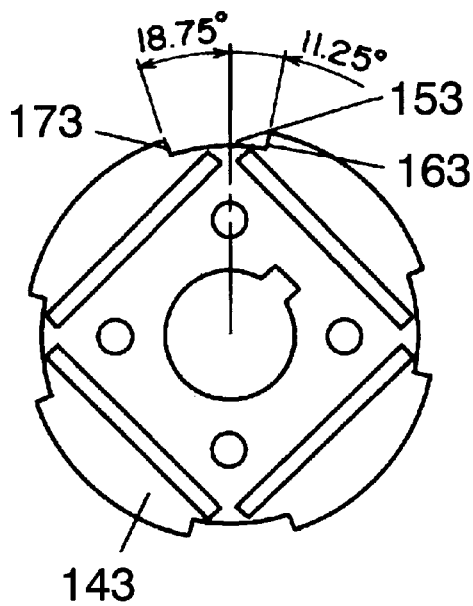
Figure 13C:
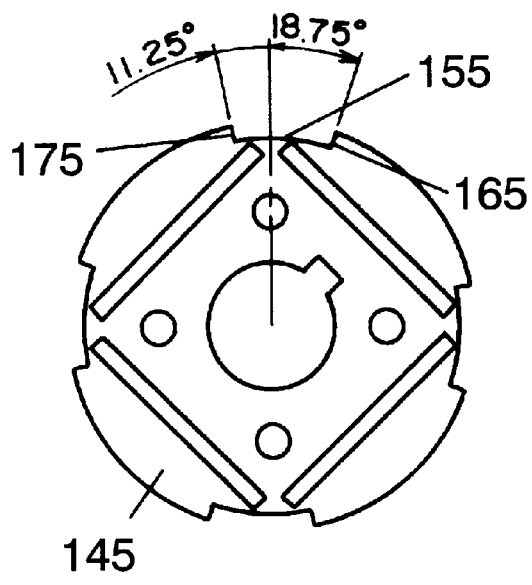
Figure 13D:
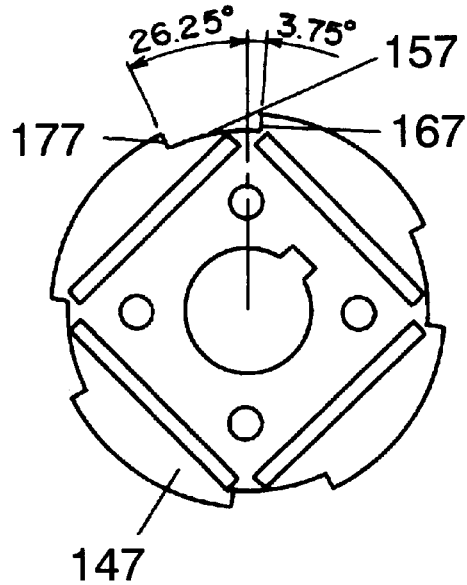

On the same rotor core, the locations of notches with regard to a forehand side and a tail-end side of the rotor pole in the rotating direction are the same at all four poles. Assume that the rotor spins in the direction "R" as shown in FIG. 13A, then angle "θi" takes four values, namely, 3.75°, 11.25°, 18.75°, and 26.25°, where angle "θi" is formed by a pole boundary and edges of respective forehand notches 161, 163, 165 and 167 in the rotating direction.

Edges of respective tail-end notches 171, 173, 175 and 177 form an angle "θ'i" with regard to the pole boundary. Angle "θ'i□ takes 26.25°, 18.75°, 11.25°, and 3.75°. Thus "θi"+"θ'i=30° is established. In the meantime, the tail-end notches discussed above are defined as follows: a tail-end notch of a rotor pole followed by the forehand notch of a following rotor pole in the rotating direction. Approx. a quarter of the total rotor-thickness is distributed to respective stacked thickness of rotor core 141, 143, 145 and 147.

This fifth embodiment has the same operation, and produces the same advantages as the fourth embodiment. In this fifth embodiment, the ends of respective magnets are located inside the respective notches, which reduces influence from the demagnetizing field to respective magnets. The construction thus allows the magnets to withstand persistently the demagnetization.

(Exemplary Embodiment 6)

Figure 14:
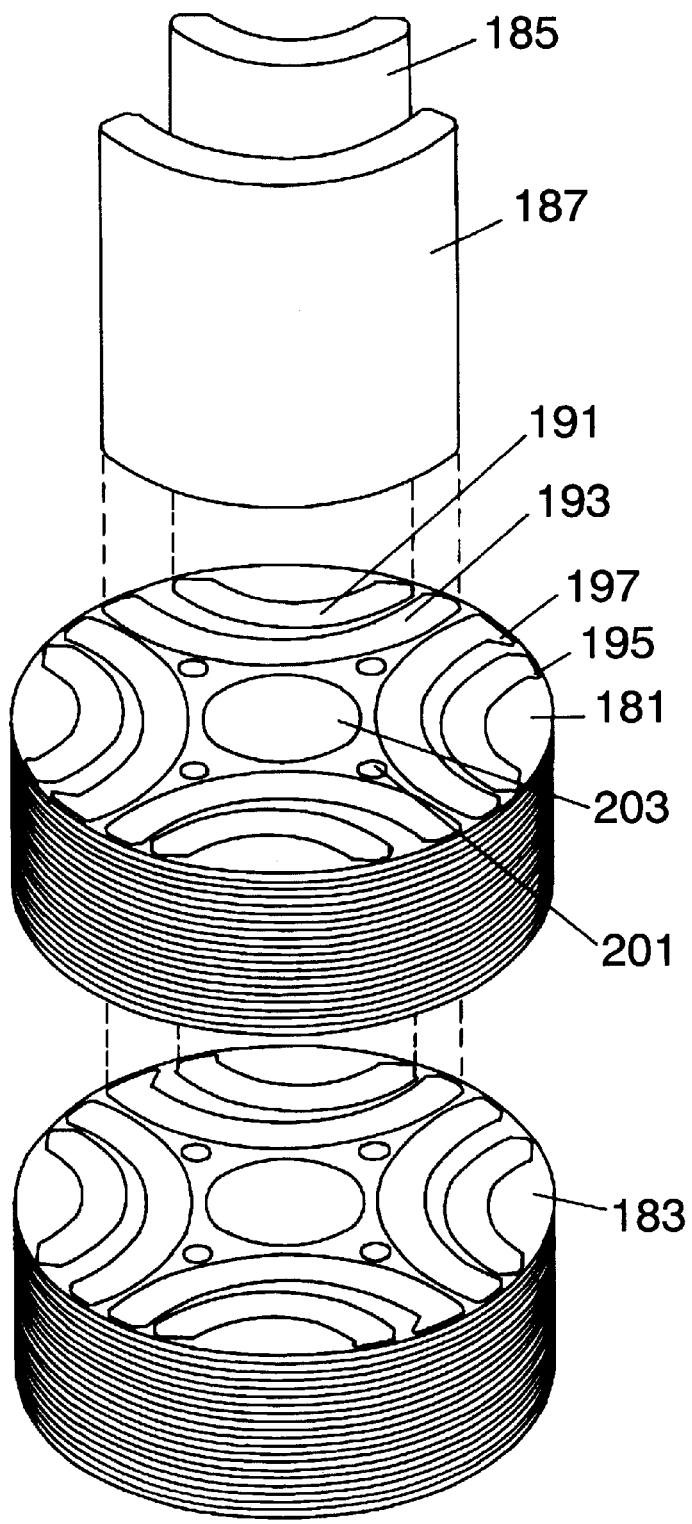
FIG. 14 is an exploded perspective view of a rotor of a motor used in a sixth exemplary embodiment of the present invention.
Figure 15A:
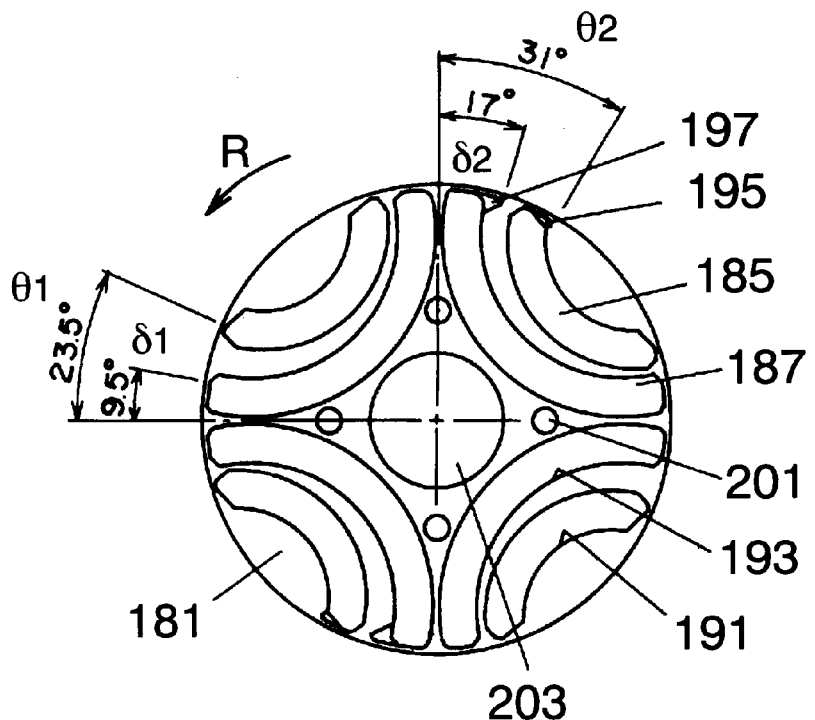
FIGS. 15A–15B are cross sections of the motor shown in FIG. 14.
Figure 15B:
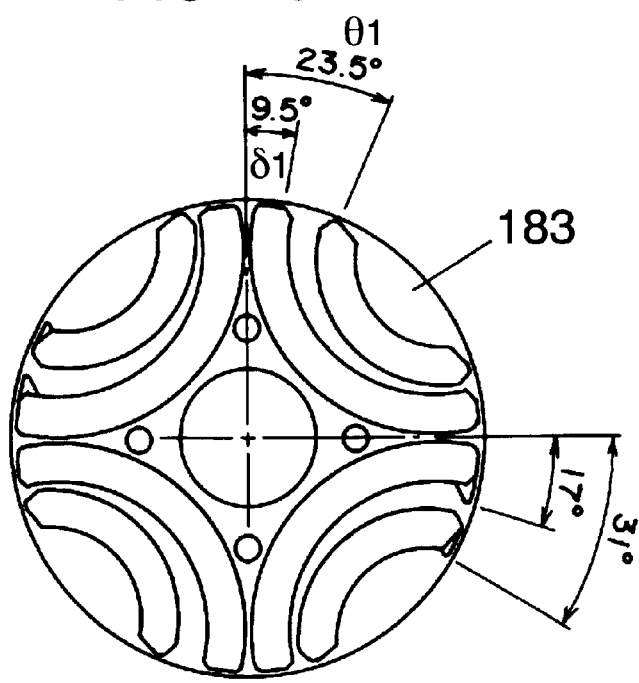

FIG. 14 is an exploded perspective view of a motor in accordance with the sixth embodiment of the present invention. FIG. 15A and FIG. 15B are cross sections of the rotor of the same motor.

In FIG. 14, permanent magnets 185 and 187 are buried within rotor cores 181 and 183. The rotor core comprises stacked rotor-core-sheets which are made of electromagnetic plate punched into approx. circular shape. Long holes 195 and 197 are provided in contact with the forehand ends of magnets 185 and 187 in the rotating direction. Long holes 195 and 197 are provided to only two poles out of four poles of the rotor.

In this sixth embodiment, a magnet per rotor pole is split into two sections in the radial direction, in other words, the two sections form a layer structure. Respective ends of outer magnet 185 and inner magnet 187 extend close to the rotor circumference. This arrangement allows both of the salient-pole-rate and reluctance torque to increase. This advantage is disclosed in the Japanese Patent Application Unexamined Publish No. H08-331783. A space between the forehand ends of outer and inner magnets is wider than that between the tail ends. This arrangement relaxes flux concentration at a specific place, and reduces iron loss. This advantage is disclosed in the Japanese Patent Application Unexamined Publish No. H08-336246.

Further, the sixth embodiment has the following advantage: Assume the rotor spins in the rotating direction "R" as shown in FIG. 15A. The forehand long holes 195 and 197 form angles "θ2" and "δ2" with regard to pole boundary. Outer magnet 185 of which forehand end defines angle "θ2" makes it 31°, and inner magnet 187 of which forehand end defines "δ2" makes it 17°. The rotor pole adjacent to the rotor pole discussed above have no forehand long holes, and respective ends of outer and inner magnets close to the rotor circumference form angles "θ1" and "δ1" with regard to pole boundary. Regarding outer magnet 185, angle "θ1" is 23.5°, and regarding inner magnet 187, angle "δ1" is 9.5°. A number of stator-slots (=teeth) is 24, i.e. (6×number of motor poles, 4), and the distributed winding method is employed. On these condition, "θj"=16+60·j·2/(4²), and "δj"=2+60·j·2/(4²) are established. Rotor core 183 is rotated by 90° with regard to rotor core 181, and then stacked thereon. Approx. a half of total thickness of the rotor is distributed to respective rotor cores 181 and 183.

The sixth embodiment can effect the same advantage as the third embodiment.

In the previous exemplary embodiments, 4-pole rotor is employed for the description; however, a number of poles, shapes of rotor-core, permanent magnet and stator are not limited to the examples used in the embodiments. Various modifications are available according to the intention of the present invention.

(Exemplary Embodiment 7)

Figure 16:
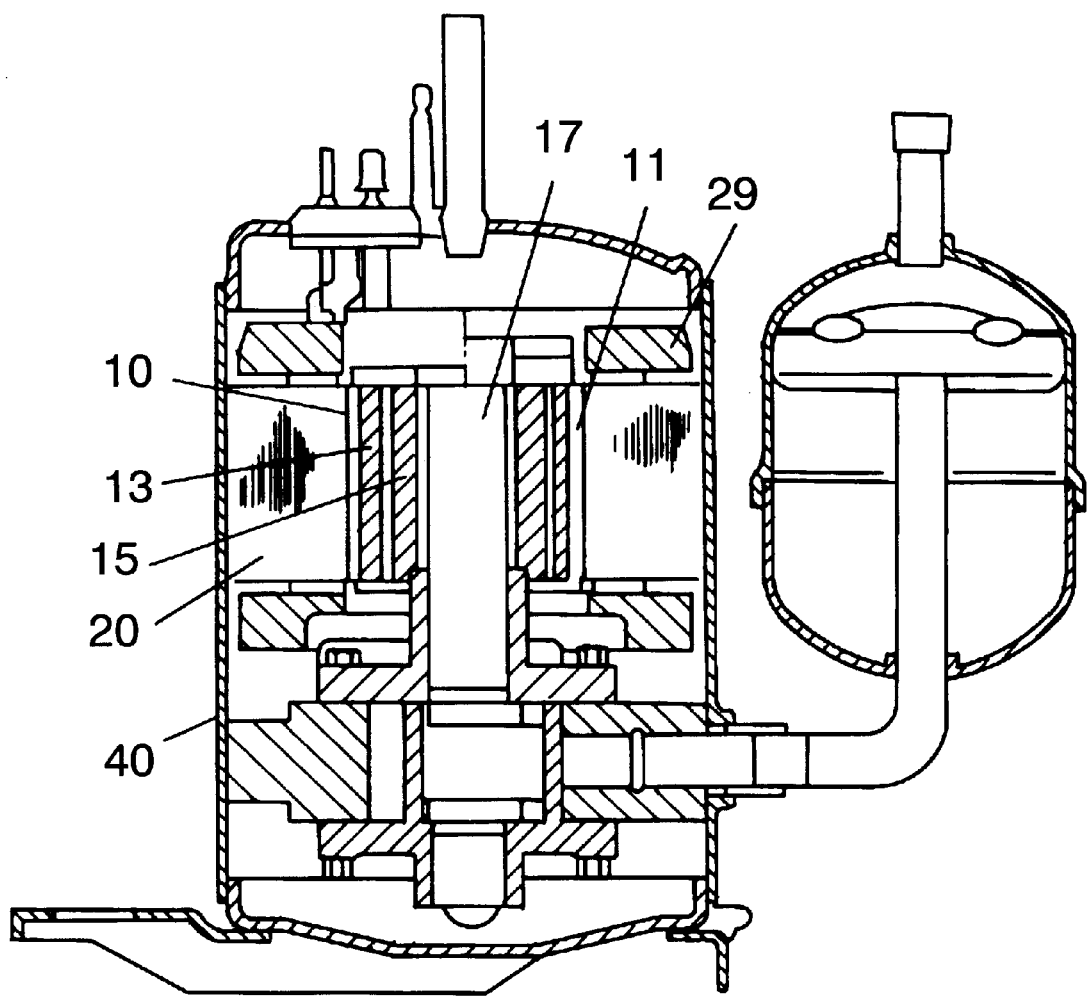
FIG. 16 is a cross section of a compressor driving unit of an air-conditioner mounted in an electric vehicle used in a seventh exemplary embodiment of the present invention.

FIG. 16 is a cross section of a compressor driving unit of an air-conditioner installed in an electric vehicle in accordance with the seventh exemplary embodiment of the present invention.

Rotor 10 is used in the motor in accordance with the first embodiment. An arc-shaped permanent magnet per pole is split into two sections in the radial direction, namely magnets 13 and 15 form a layer structure and show their hills toward the rotor center. The magnets are buried within the rotor core 11, and non-magnetic sections are provided between respective magnets 13 and 15 and rotor circumference. Concentrated windings are provided on respective teeth of the stator. Rotor 10 faces stator 20 via an annular space, thereby forming the motor. This motor is integrated as a driver into shell 40 of the compressor.

Not only the motor of the first exemplary embodiment but also that of the second through sixth embodiments are applicable to this seventh embodiment with the same operations and advantages as those of the original embodiments. When a brush-less motor is integrated as a driver into a compressor that requires air-tight shield, it is difficult to detect the rotor location of the motor with a sensor such as a Hall element. Because the Hall element requires wiring for its input and output, and yet, the Hall element is subjected to a high pressure resulting from operating the compressor, thus an exact detection of the rotor cannot be expected. Therefore, when the brushless motor is integrated as a driver into the compressor, driving without using a sensor (sensorless driving) is practiced in general.

In this case, when the concentrated winding is provided on the stator, a large amount current rushes at power-on, and the rotor may be subjected to a heavy demagnetizing field. Permanent magnets are buried within the rotor so that the heavy demagnetizing field can be restrained to affect the magnets. Further, the motor height including coil ends is lessened, and a higher efficiency can be expected. The driving unit employing this motor is good for the compressor of air-conditioner for an electric vehicle that badly needs low power consumption and a small and light body. If the rare earth magnets are employed, the rotor core can be further thinned, which results in a smaller body of the driving unit.

(Exemplary Embodiment 8)

Figure 17:
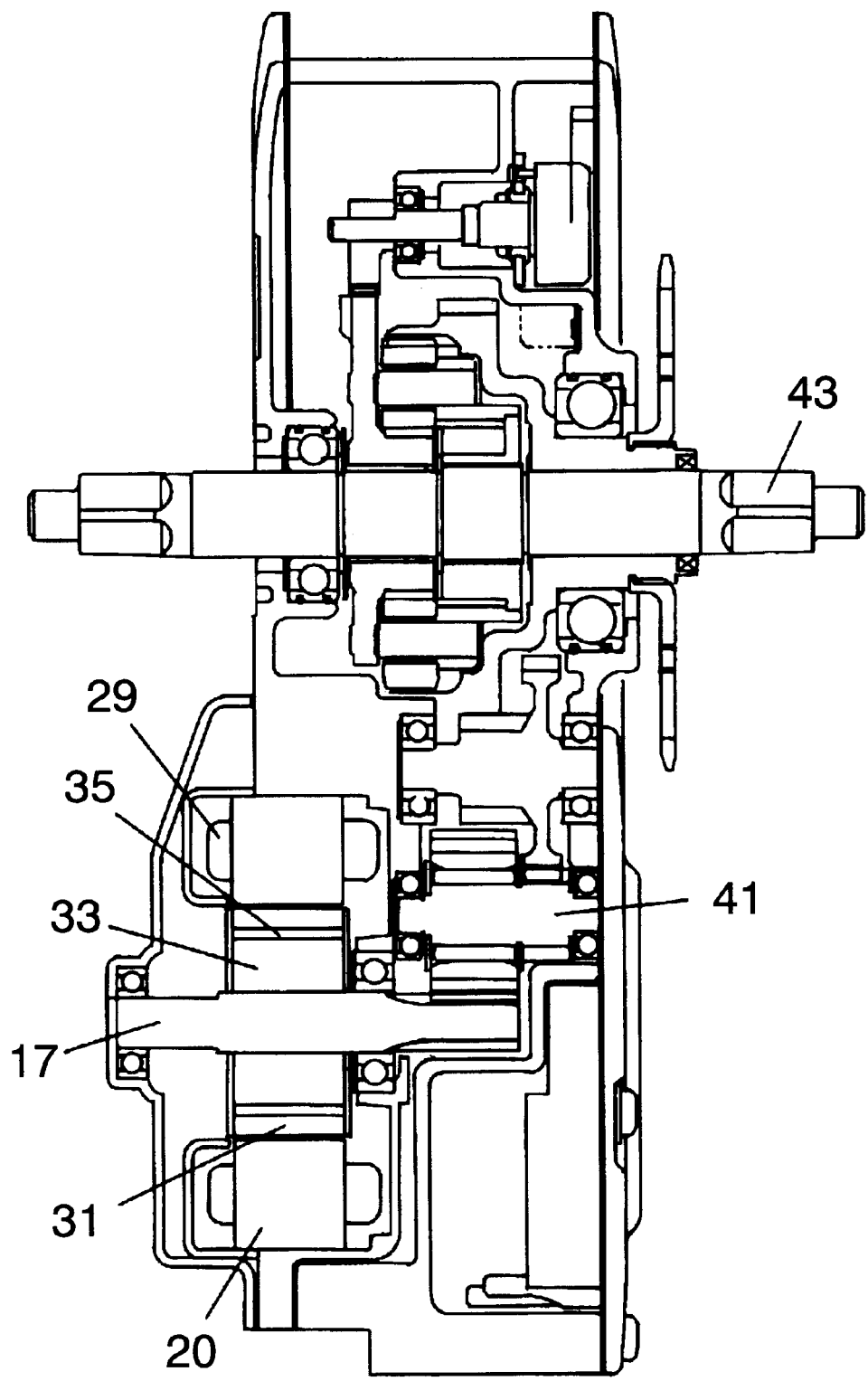
FIG. 17 is a cross section of a driving unit of an electric vehicle used in an eighth exemplary embodiment of the present invention.
Figure 18:
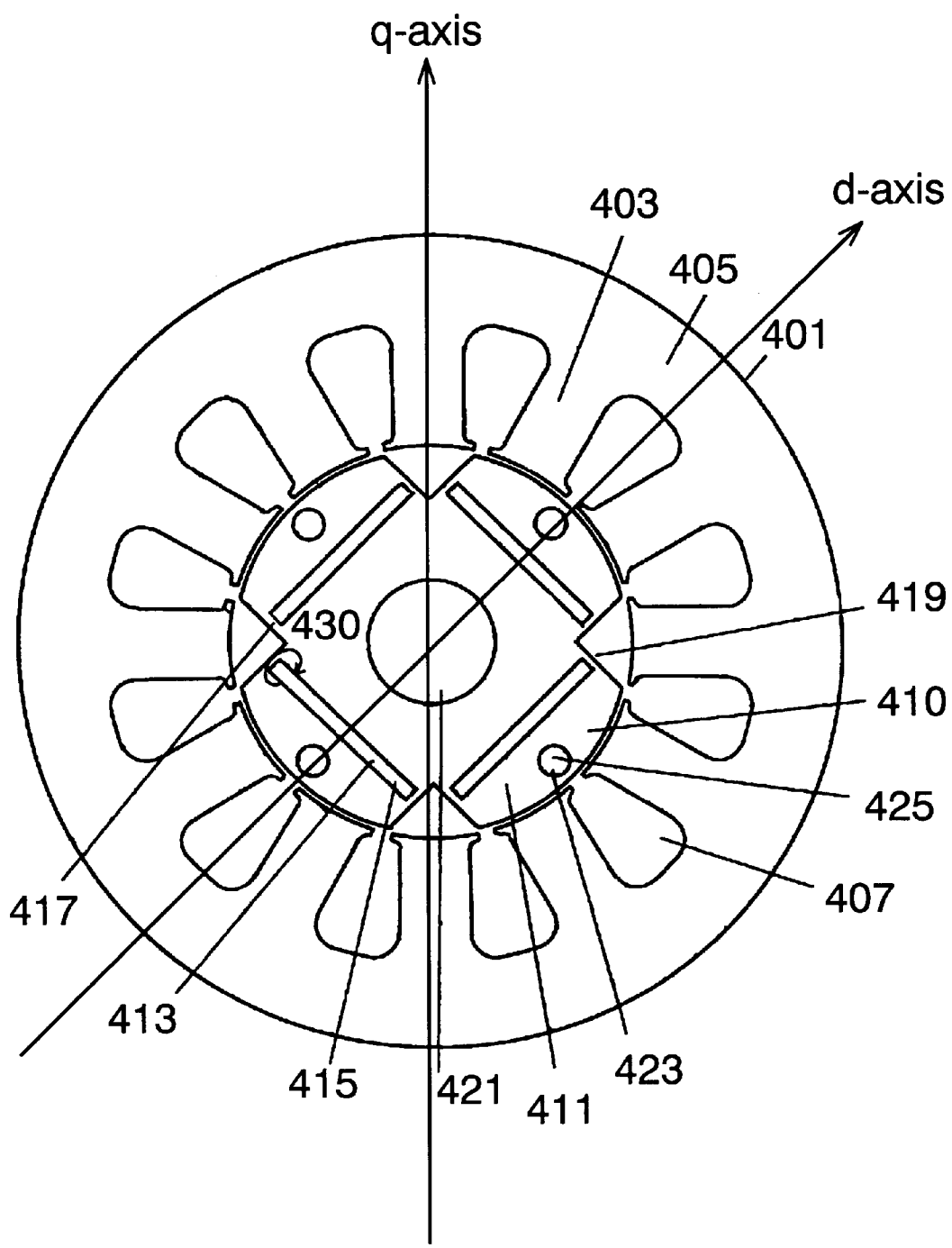
FIG. 18 is a cross section of a motor employing a conventional rotor with interior permanent magnets.

FIG. 17 is a cross section of a driving unit for an electric bicycle in accordance with the eighth exemplary embodiment.

Any motor constructions used in the first through sixth embodiments can be applicable to the structure shown in FIG. 17 with the same operation and advantages.

The structure and operation of the eighth embodiment is described hereinafter.

Rotation of rotary shaft 17 of motor is transferred to output shaft 43 of the driving unit via gear 41. Output shaft 43 is linked to pedals (not shown) of the bicycle. When a bicycle is electrically assisted, load torque is controlled responsive to rider's pedaling force, thus a large torque is required, and a spin speed of 2000–5000 r/min is needed. A motor with a rotor having interior permanent magnets and four poles is the best choice for this application because of its large output. Since the driving unit is mounted to a bicycle, a slim body and lightweight are desired. A higher efficiency motor would increase a travelling distance of the bicycle with one charge. When a rider starts pedaling, or the bicycle runs uphill, a great electrical-assist works, i.e. a large torque is loaded to the motor and a large current runs the motor. At this time demagnetizing field is produced; however, the interior permanent magnets can prevent the demagnetizing field from being imposed thereon. As described above, the motor of the present invention is good for the driving unit for the electric bicycle.

The present invention is not limited to the embodiments discussed above, but the shape and specification of the motor can be modified, and combination of an apparatus to the motor also can be modified according to the intention of the present invention.

The motor of the present invention comprises the following elements:

a stator-core comprising a plurality of teeth and a yoke that links the teeth;

coils wound on the teeth in a concentrated winding form; and a rotor with interior permanent magnets.

The rotor with interior permanent magnets comprises the following elements: rotor cores having a plurality of slits of which ends extend closely to the rotor circumference;

permanent magnets positioned in the slits;

non-magnetic-sections provided between the circumference of the rotor-cores and respective ends of permanent magnets.

This construction allows the motor to withstand persistently demagnetization, to be a smaller size with high efficiency, and to be manufactured in a highly efficient manner. The motor can be integrated as a driver into an apparatus driving unit.

In particular, an apparatus which strongly requires power saving, a small and light body, e.g. a compressor of air-conditioner for an electric vehicle, and an electric bicycle, is the best item to integrate this motor with a rotor having interior permanent magnets for effecting great practical advantages.

What is claimed is:

1. A motor comprising:
   (a) a stator core comprising a plurality of teeth and a yoke that links the teeth;
   (b) coils wound on the teeth; and
   (c) a rotor with at least one interior permanent magnet and an axis of rotation, wherein said rotor comprises:
      (c-1) a plurality of rotor cores formed from stacked rotor-core-sheets made of electromagnetic steel plates;
      (c-2) an interior permanent magnet buried within said rotor;
      (c-3) a non-magnetic-section located along the outer circumference of the rotor provided in contact with at least one longitudinal end of said permanent magnet; and
      (c-4) an angle "θ" made by a width of the non-magnetic section along the outer circumference of the rotor which is measured radially around the axis of rotation from a pole boundary to the distal end of the non-magnetic section,
   wherein the rotor is formed by stacking a plurality of rotor cores together, and the size of the angle "θ" is varied between adjacent rotor cores along an axial direction which is parallel to the axis of rotation.

2. The motor as defined in claim 1 wherein said non-magnetic-section extends in a circular direction of rotor circumference.

3. The motor as defined in claim 1 wherein said permanent magnet buried within said rotor core is a solid plate.

4. The motor as defined in claim 1 wherein said permanent magnet is buried axially and straight free from being skewed within said rotor core.

5. The apparatus driving unit as defined in claim 1, wherein said driving unit drives a compressor of an air-conditioner installed in an electric vehicle.

6. The apparatus driving unit as defined in claim 1, wherein said driving unit drives a compressor of an air-conditioner installed in a vehicle.

7. The motor as defined in claim 1 wherein said rotor having interior permanent magnet comprises "N" different shapes of rotor cores having different angles "θi", and "N" different shapes of rotor cores having approximately the same thickness, and the following equation is established:

θi=θ0+120·i/(P·N), where P=a number of rotor poles, and a number of stator-slots is one of $(3/2) \times P$ and 3P, "$\theta 0$" is a constant that satisfies $0 \leq \theta i \leq 120/P$, i=1, 2, . . . , N.

8. The motor as defined in claim 1 wherein said rotor having interior permanent magnet comprises "N" different shapes of rotor cores having different angles "$\theta i$", and "N" different shapes of rotor cores having approximately the same thickness, and the following equation is established: $\theta i = \theta 0 + 60 \cdot i/(P \cdot N)$, where P=a number of rotor poles, and a number of stator-slots is 6P, "$\theta 0$" is a constant that satisfies $0 \leq \theta i \leq 120/P$, i=1, 2, . . . , N.

9. The motor as defined in claim 7 or claim 8 wherein $\theta i + \theta' i = 120/P$ is established, where $\theta' i$ is an angle extent between a pole boundary and a tail-end non-magnetic-section of "i" th rotor-core-sheet of the rotor pole in rotating direction of said rotor.

10. The motor as defined in claim 1, wherein said rotor with said interior permanent magnet is formed by stacking n/P rotor-cores and shifting the adjacent rotor cores by an angle of $360 \cdot j/P$, and the following equation is established: $\theta j = \theta 0 + 120 \cdot j \cdot n/(P^2)$ where the angle "$\theta j$" takes P/n values, and each angle "$\theta j$" value is repeated "n" times in an axial direction, P is a number of rotor poles, and a number of stator-slots is one of (3/2) P and 3P, $\theta 0$ is a constant satisfying $0 \leq \theta j \leq 120/P$, j=1, 2, . . . , P/n, "n" is a natural number not more than P/2.

11. The motor as defined in claim 1, wherein said rotor with said interior permanent magnet is formed by stacking n/P rotor-cores and shifting the adjacent rotor cores by an angle of $360 \cdot j/P$, and the following equation is established: $\theta j = \theta 0 + 60 \cdot j \cdot n/(P^2)$ where the angle "$\theta j$" takes P/n values, and each angle "$\theta j$" value is repeated "n" times in an axial direction, P is a number of rotor poles, and a number of stator-slots is 6P, $\theta 0$ is a constant satisfying $0 \leq \theta j \leq 120/P$, j=1, 2, . . . , P/n, "n" is a natural number not more than P/2.

12. The motor as defined in claim 10 or claim 11 wherein said "n"=1.

13. The motor as defined in claim 10 or claim 11 wherein $\theta j + \theta' j = 120/P$ is established where $\theta' j$ is an angle extent between a pole boundary and a tail-end non-magnetic-section of a rotor pole adjacent to the forehand non-magnetic-section of "j" th rotor pole in rotating direction of said rotor.

14. A motor comprising:

(a) a stator core comprising a plurality of teeth and a yoke that links the teeth;

(b) coils wound on the teeth; and (c) a rotor with at least one interior permanent magnet and an axis of rotation, wherein said rotor comprises:

(c-1) a plurality of rotor cores formed from stacked rotor-core-sheets made of electromagnetic steel plates;

(c-2) an interior permanent magnet buried within said rotor core;

(c-3) a notch in the outer circumference of the rotor adjacent to a longitudinal end of a permanent magnet; and (c-4) an angle "$\theta$" made by a width of the notch along the outer circumference of the rotor which is measured radially around the axis of rotation from a pole boundary to the distal end of the notch, wherein the rotor is formed by stacking a plurality of rotor cores together, and the size of the angle "$\theta$" is varied between adjacent rotor cores along an axial direction which is parallel to the axis of rotation.

15. The motor as defined in claim 14 wherein said rotor having an interior permanent magnet comprises "N" different shapes of rotor cores having different angles "$\theta i$", and "N" different shapes of rotor cores having approximately the same thickness, and the following equation is established: $\theta i = \theta 0 + 120 \cdot i/(P \cdot N)$, where P=a number of rotor poles, and a number of stator-slots is one of $(3/2) \times P$ and 3P, "$\theta 0$" is a constant that satisfies $0 \leq \theta i \leq 120/P$, i=1, 2, . . . , N.

16. The motor as defined in claim 1 or claim 14 wherein among the stacked plurality of rotor cores, respective thicknesses of the rotor cores positioned at both ends in axial direction are thicker than other rotor cores by 0.5 mm–2.5 mm.

17. The apparatus driving unit as defined in claim 14, wherein said driving unit drives a compressor of an air-conditioner installed in an electric vehicle.

18. The apparatus driving unit as defined in claim 14, wherein said driving unit drives a compressor of an air-conditioner installed in a vehicle.

19. The motor as defined in claim 14 wherein said rotor having an interior permanent magnet comprises "N" different shapes of rotor cores having different angles "$\theta i$", and each of "N" different shapes of rotor cores having approximately the same thickness, and the following equation is established: $\theta i = \theta 0 + 60 \cdot i/(P \cdot N)$, where P=a number of rotor poles, and a number of stator-slots is 6P, "$\theta 0$" is a constant that satisfies $0 \leq \theta i \leq 120/P$, i=1, 2, . . . , N.

20. The motor as defined in claim 15 or claim 19 wherein $\theta i + \theta' i = 120/P$ is established, where $\theta' i$ is an angle extent between a pole boundary and an edge of a tail-end notch of "i" th rotor-core-sheet of the rotor pole in rotating direction of said rotor.

21. The motor as defined in claim 14 wherein said rotor with said interior permanent magnet is formed by stacking n/P rotor-cores and shifting the adjacent rotor cores by an angle of $360 \cdot j/P$, and the following equation is established: $\theta j = \theta 0 + 120 \cdot j \cdot n/(P2)$, where the angle "$\theta j$" takes P/n values, and each angle "$\theta j$" value is repeated "n" times in an axial direction, P is a number of rotor poles, and a number of stator-slots is one of (3/2) P and 3P, $\theta 0$ is a constant satisfying $0 \leq \theta j \leq 120/P$, j=1, 2, . . . , P/n, "n" is a natural number not more than P/2.

22. The motor as defined in claim 14 wherein said rotor with said interior permanent magnet is formed by stacking n/P rotor-cores and shifting the adjacent rotor cores by an angle of $360 \cdot j/P$, and the following equation is established: $\theta j = \theta 0 + 60 \cdot j \cdot n/(P2)$, where the angle "$\theta j$" takes $P/n$ values, and each angle "$\theta j$" value is repeated "$n$" times in an axial direction, P is a number of rotor poles, and a number of stator-slots is 6P, $\theta 0$ is a constant satisfying $0 \leq \theta j \leq 120/P$, $j=1, 2, \ldots, P/n$, "n" is a natural number not more than $P/2$.

23. The motor as defined in claim 21 or claim 22 wherein said "n"=1.

24. The motor as defined in claim 21 or claim 22 wherein $\theta j + \theta' j = 120/P$ is established where $\theta' j$ is an angle extent between a pole boundary and the edge of the tail-end notch of the rotor pole adjacent to the forehand notch of "j" th rotor pole in rotating direction of said rotor.

* * * * *